United States Patent
Huang et al.

(10) Patent No.: US 12,150,203 B2
(45) Date of Patent: *Nov. 19, 2024

(54) COMMUNICATION METHOD AND RELATED PRODUCT

(71) Applicant: HUAWEI TECHNOLOGIES CO., LTD., Guangdong (CN)

(72) Inventors: Yada Huang, Shanghai (CN); Yuanping Zhu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/359,439

(22) Filed: Jul. 26, 2023

(65) Prior Publication Data

US 2024/0098844 A1    Mar. 21, 2024

Related U.S. Application Data

(63) Continuation of application No. 17/569,120, filed on Jan. 5, 2022, now Pat. No. 11,758,612, which is a
(Continued)

(30) Foreign Application Priority Data

Dec. 28, 2017    (CN) .......................... 201711453932.1

(51) Int. Cl.
*H04H 20/71*    (2008.01)
*H04W 4/06*    (2009.01)
*H04W 76/40*    (2018.01)

(52) U.S. Cl.
CPC ............. *H04W 76/40* (2018.02); *H04W 4/06* (2013.01)

(58) Field of Classification Search
CPC ................................ H04W 76/40; H04W 4/06
(Continued)

(56) References Cited

U.S. PATENT DOCUMENTS

| | | | |
|---|---|---|---|
| 11,259,361 B2* | 2/2022 | Huang | H04L 12/185 |
| 11,758,612 B2* | 9/2023 | Huang | H04W 4/06 |
| | | | 370/312 |

(Continued)

FOREIGN PATENT DOCUMENTS

| | | |
|---|---|---|
| CN | 1852551 | 10/2006 |
| CN | 101052141 | 10/2007 |

(Continued)

OTHER PUBLICATIONS

Office Action in Japanese Appln. No. 2022-047814, mailed on Dec. 26, 2023, 6 pages (with English translation).

(Continued)

*Primary Examiner* — Chuong T Ho
(74) *Attorney, Agent, or Firm* — Fish & Richardson P.C.

(57) ABSTRACT

Embodiments of the present invention disclose a communication method and a related product. A method implemented on an access network side includes: sending, by an access network device, indication information to user equipment, where the indication information is used to indicate a manner of receiving multicast service data, and the receiving manner includes a unicast manner and/or a multicast manner; and sending, by the access network device, the multicast service data in the unicast manner and/or the multicast manner indicated by the indication information.

20 Claims, 21 Drawing Sheets

Related U.S. Application Data continuation of application No. 16/909,891, filed on Jun. 23, 2020, now Pat. No. 11,259,361, which is a continuation of application No. PCT/CN2018/124928, filed on Dec. 28, 2018.

(58) Field of Classification Search
USPC ......................................................... 370/312
See application file for complete search history.

(56) References Cited

U.S. PATENT DOCUMENTS

| | | | |
|---|---|---|---|
| 2007/0220573 A1 | 9/2007 | Chiussi et al. | |
| 2008/0080408 A1 | 4/2008 | Gao | |
| 2011/0116433 A1 | 5/2011 | Dorenbosch | |
| 2011/0216688 A1 | 9/2011 | Katori | |
| 2012/0263089 A1 | 10/2012 | Gupta et al. | |
| 2013/0028118 A1 | 1/2013 | Cherian | |
| 2014/0286222 A1 | 9/2014 | Yu et al. | |
| 2014/0362694 A1 | 12/2014 | Rodrigues | |
| 2015/0304378 A1 | 10/2015 | Bi et al. | |
| 2015/0358374 A1 | 12/2015 | Wei et al. | |
| 2016/0021516 A1 | 1/2016 | Han | |
| 2016/0080531 A1 | 3/2016 | Agiwal | |
| 2016/0211980 A1 | 7/2016 | Zhu et al. | |
| 2018/0288729 A1 | 10/2018 | Li et al. | |
| 2018/0375790 A1* | 12/2018 | Dadashikelayeh | ... H04L 67/565 |
| 2018/0375799 A1 | 12/2018 | Liu et al. | |
| 2019/0132141 A1 | 5/2019 | Li et al. | |
| 2019/0174461 A1 | 6/2019 | Wang et al. | |
| 2019/0327726 A1* | 10/2019 | Zhang | ................... H04W 72/21 |

FOREIGN PATENT DOCUMENTS

| | | |
|---|---|---|
| CN | 101136759 | 3/2008 |
| CN | 101146255 | 3/2008 |
| CN | 101267593 | 9/2008 |
| CN | 101299824 | 11/2008 |
| CN | 101370156 | 2/2009 |
| CN | 102056082 | 5/2011 |
| CN | 102149021 | 8/2011 |
| CN | 102857873 | 1/2013 |
| CN | 103209045 | 7/2013 |
| CN | 103796170 | 5/2014 |
| CN | 104540043 | 4/2015 |
| CN | 105376717 | 3/2016 |
| CN | 106488409 | 3/2017 |
| CN | 109769150 | 5/2019 |
| EP | 2978245 | 1/2016 |
| JP | 2010502054 | 1/2010 |
| JP | 2016007007 | 1/2016 |
| JP | 2016535494 | 11/2016 |
| RU | 2604424 | 12/2016 |
| WO | 2010061483 | 6/2010 |
| WO | 2015161787 | 10/2015 |
| WO | 2016054588 | 4/2016 |

OTHER PUBLICATIONS

EP Summons to attend oral proceedings pursuant to Rule 115(1) EPC in European Appln No. 18897311.9, dated Apr. 18, 2023, 6 pages.

Lin Yu et al, "A Dynamic Retransmission Control Algorithm for Reliable Mobile Multicast in MSS," Jun. 12, 2003, total 7 pages.

Mehdizadeh et al., "Multicast-Unicast Data Delivery Method in Wireless IPv6 Networks," Journal of Network and Systems Management, vol. 22, No. 4, Oct. 2014, 26 pages.

Office Action in Japanese Appln. No. 2022-047814, mailed on Jul. 4, 2023, 6 pages (with English translation).

Office Action issued in Chinese Application No. 202110522822.6 on Jan. 5, 2022, 23 pages (with English translation).

Office Action issued in Chinese Application No. 202110522822.6 on Jul. 14, 2022, 5 pages.

Office Action issued in Japanese Application No. 2020-535162 on Feb. 22, 2022, 3 pages (with English translation).

Office Action issued in Russian Application No. 2020124395/07(042173) on Jan. 17, 2022, 19 pages (with English translation).

* cited by examiner

COMMUNICATION METHOD AND RELATED PRODUCT

CROSS-REFERENCE TO RELATED APPLICATIONS

This application is a continuation of U.S. patent application Ser. No. 17/569,120, filed on Jan. 5, 2022, which is a continuation of U.S. patent application Ser. No. 16/909,891, filed on Jun. 23, 2020, now U.S. Pat. No. 11,259,361, which is a continuation of International Application No. PCT/CN2018/124928, filed on Dec. 28, 2018, which claims priority to Chinese Patent Application No. 201711453932.1, filed on Dec. 28, 2017. All of the aforementioned patent applications are hereby incorporated by reference in their entireties.

TECHNICAL FIELD

The present invention relates to the field of communications technologies, and in particular, to a communication method and a related product.

BACKGROUND

Multicast is a manner in which a plurality of receive ends form a multicast group and a data source transfers data to the plurality of receive ends in the multicast group. With rapid development of mobile communications services, a large quantity of multimedia services emerge. For some application services such as video live broadcast, television broadcast, a video conference, online education, and an interactive game, a plurality of receive ends can simultaneously receive same data. Compared with common data, these mobile multimedia services are characterized by a large data volume, long duration, and latency sensitivity.

To make the most effective use of mobile network resources, a multimedia broadcast/multicast service (multimedia broadcast/multicast service, MBMS) is introduced into the 3rd generation partnership project (Third Generation Partnership Project, 3GPP) Rel-6, to provide a multicast service for a universal mobile telecommunications system (universal mobile telecommunications system, UMTS) by using a cellular network. Standardization of the MBMS is always in an evolution process.

To ensure that the MBMS can cover a sufficient area and that all user equipments (User Equipment, UE) in a multicast group can successfully receive multicast service data, an MBMS system sets a corresponding modulation and coding scheme and a multimedia resource by using user equipment with the worst signal quality in the multicast group as a reference. Because attenuation of wireless signal strength and a distance have an exponential relationship, spectral efficiency of user equipment with relatively poor signal quality in the multicast group is usually five to dozens of times less than average spectral efficiency, resulting in very low transmission efficiency.

SUMMARY

A technical problem to be resolved in embodiments of the present invention is low transmission efficiency of multicast communication. A communication method and a related product are provided, to improve the transmission efficiency of the multicast communication.

According to a first aspect, an embodiment of the present invention provides a communication method, including:

sending, by an access network device, indication information to user equipment, where the indication information is used to indicate a manner of receiving multicast service data, and the receiving manner includes a unicast manner and/or a multicast manner; and sending, by the access network device, the multicast service data in the unicast manner and/or the multicast manner indicated by the indication information.

The access network device may be a base station or another device that provides a network access function to the user equipment. Each of the unicast manner and the multicast manner corresponds to a data transmission manner. Using data sending as an example, in the unicast manner, a transmit end and a receive end of data are in a one-to-one correspondence. In this manner, the receive end and the transmit end may be well matched based on respective data transmission capabilities, and retransmission is facilitated. In the multicast manner, a transmit end and receive ends of data are in a one-to-many correspondence. In this manner, the transmit end sends same data to the plurality of receive ends on one air interface resource, thereby saving air interface resources. It may be understood that a data receiving manner corresponds to a data sending manner. For example, if a transmit end sends data in the unicast manner, a receive end receives the data in the unicast manner.

The indication information may be explicit indication information, for example, a dedicated flag bit. Alternatively, the indication information may be an implicit indication manner, for example, sending corresponding configuration information. More specifically, for example, assuming that it is required to instruct to receive the service data in the multicast manner, only configuration information of a multicast service may be sent.

In addition, before the user equipment receives the multicast service data in the unicast manner and/or the multicast manner, a radio bearer needs to be established, and corresponding configuration information is required for establishing the radio bearer. To distinguish between configuration information used for radio bearers corresponding to two manners of receiving the multicast service data, the configuration information used for the radio bearer corresponding to the unicast manner for receiving the multicast service data may be referred to as unicast configuration information, and the configuration information used for the radio bearer corresponding to the multicast manner for receiving the multicast service data may be referred to as multicast configuration information.

In this embodiment of the present invention, sending of the multicast service data is not limited to that all user equipments that receive the multicast service data receive the multicast service data in the multicast manner, thereby facilitating exclusion of user equipment that affects transmission efficiency, and improving the transmission efficiency of the multicast service.

In an optional implementation, that the access network device provides the configuration information about how to receive the multicast service data is further provided. The method further includes:

sending, by the access network device, the configuration information to the user equipment, where the configuration information is used to receive the multicast service data.

The configuration information is described above. The configuration information may be classified into the multicast configuration information and the unicast configuration information, which are respectively used to establish the radio bearer applicable to transmitting the multicast service data in the multicast manner, and establish the radio bearer applicable to transmitting the multicast service data in the unicast manner. In this embodiment of the present invention, the configuration information and the indication information may be sent by using same signaling. If the configuration information is used as implicit indication information, the configuration information may be used as the indication information.

In this embodiment, the configuration information is used to receive the multicast service data, because the multicast service data may be received in the unicast manner and/or the multicast manner, the configuration information may include the multicast configuration information and the unicast configuration information, or include only configuration information corresponding to the manner of receiving the multicast service data.

In an optional implementation, specific content of the configuration information is further provided. The configuration information includes:

at least one of configuration information of a multicast bearer, multicast session information corresponding to the multicast bearer, logical channel information of the multicast bearer, multicast scheduling identifier information, information about a transmission channel for sending the multicast service data in the multicast manner, information about a transmission channel for sending the multicast service data in the unicast manner, multicast logical channel information, measurement configuration information of the transmission channel of the multicast service data, and multicast-associated unicast configuration information.

The configuration information is information mainly used to establish a radio bearer. The foregoing information is used as an example of a possible implementation, and should not be understood as a unique limitation on this embodiment of the present invention.

In an optional implementation, a specific solution in which the access network device obtains multicast service information is further provided. The method further includes:

receiving, by the access network device, the multicast service information sent by the user equipment or a core network device, where the multicast service information is used to instruct the user equipment to receive the multicast service data, and the multicast service information includes identifier information of the user equipment and identifier information of the multicast service.

The access network device needs to indicate a manner used by the user equipment to receive the multicast service data, so that the access network device needs to learn of the user equipment that participates in receiving the multicast service data and a change status of the user equipment. Therefore, this solution is provided in this embodiment. The foregoing multicast service information may be sent after a multicast session is established, or may be update information sent by the core network device after user equipment joins or leaves a multicast group. The user equipment may report the multicast service information at any time, for example, after it is determined that the user equipment successfully joins the multicast session, or after the manner of receiving the multicast service is switched.

In an optional implementation, an optional implementation in which the access network device obtains the multicast service information is further provided. The receiving, by the access network device, the multicast service information sent by the user equipment or a core network device includes:

receiving, by the access network device, a multicast session establishment request sent by the core network device, where the multicast session establishment request includes the identifier information of the user equipment and the identifier information of the multicast service; or receiving, by the access network device, multicast member change information sent by the core network device or the user equipment.

This embodiment provides a specific implementation solution of obtaining the multicast service information from the user equipment and obtaining the multicast service information from the core network device. The multicast session establishment request is a request used by the user equipment to request to establish a multicast session. The access network device may obtain the multicast service information by using the request without increasing signaling. In addition, the access network device may obtain the multicast service information in another case, which is described above and is not described herein again.

The multicast member change information is information sent when user equipment in the multicast group changes. The information may include the identifier information of the multicast service and identifiers of all user equipments in the multicast group. Alternatively, only changed information may be sent, for example, an identifier of user equipment and a change identifier, and the change identifier is used to indicate whether the user equipment newly joins the multicast group or leaves the multicast group.

In an optional implementation, an implementation in which the access network device obtains the multicast service data is further provided. The method further includes:

instructing, by the access network device based on a quantity of user equipments that receive the multicast service data, the user equipment to receive the multicast service data in the unicast manner and/or the multicast manner; or receiving, by the access network device, channel measurement information sent by the user equipment, and instructing, based on the channel measurement information, the user equipment to receive the multicast service data in the unicast manner and/or the multicast manner.

In this embodiment, the former manner of receiving the multicast service data is related to the quantity of user equipments that receive the multicast service data, and the access network device may use a threshold as a comparison standard. Specifically, if the quantity of user equipments that receive the multicast service data is greater than the threshold, the multicast manner is used; or if the quantity of user equipments that receive the multicast service data is less than the threshold, the unicast manner is used. In this embodiment, it is mainly considered that the more user equipments that receive the multicast service data, the more air interface resources are saved if the multicast manner is used. The threshold may be configured in the access network device, or may be specified by the core network device or another device that manages the access network device. This is not uniquely limited in this embodiment of the present invention.

The latter manner of receiving the multicast service data is related to channel quality of the user equipment, and specific related content may mainly include the following several types:

A. An absolute value of the channel quality is used. To be specific, if the channel quality is lower than a particular threshold, the unicast manner is used; otherwise, the multicast manner is used. In this embodiment, it is mainly considered that the poorer the channel quality is, the more likely overall transmission efficiency of the multicast service is reduced. Therefore, it may be considered to use the unicast manner to send the multicast service data to the user equipment.

B. A relative value of the channel quality is used. For example, in a multicast group, if a difference between channel quality of user equipments is relatively large, user equipments with relatively poor channel quality reduce transmission efficiency of a multicast service. Therefore, the user equipments with the relatively poor channel quality may be removed from the multicast group. If there are a relatively large quantity of user equipments with relatively poor channel quality, the user equipments may further form another multicast group.

C. Grouping is performed based on parameters that affect the channel quality. For example, some parameters affect the channel quality, for example, distribution of user equipments, a movement speed of the user equipment, and a movement direction of the user equipment. Based on this, the user equipments may be grouped. If a quantity of user equipments in the group is sufficient, the user equipments form a multicast group. Otherwise, the multicast service data is received in the unicast manner.

In this embodiment, the channel measurement information may be channel measurement feedback information, or may be any other information that can reflect the channel quality. The user equipment may periodically feed back the channel measurement information, or may feed back the channel measurement information when a particular condition is satisfied. The particular condition may be that the channel quality or the parameter that affects the channel quality changes, or may be that a condition in which the receiving manner needs to be switched is satisfied. In this embodiment of the present invention, when and how sending of the channel measurement information to the access network device is triggered is not limited.

In an optional implementation, an implementation solution in which the multicast group is further divided is further provided. The configuration information includes first multicast configuration information and second multicast configuration information; and the indication information indicates that the manner of receiving the multicast service data includes the multicast manner, and the indication information indicates that the first multicast configuration information or the second multicast configuration information is used to receive the multicast service data.

In this embodiment, the multicast configuration information includes at least two pieces of multicast configuration information. In this way, the user equipments that receive the multicast service data may be divided into two sub-multicast groups. Because the two sub-multicast groups use different multicast configuration information, different radio bearers are established, and transmission efficiency in the different sub-multicast groups may be maximized.

In an optional implementation, an implementation solution in which the multicast group is further divided is further provided. If the receiving manner includes the multicast manner, the indication information further includes: indicating that the multicast service data is received in a first multicast manner or a second multicast manner.

A difference between this embodiment and the previous embodiment lies in that the access network device may send only one piece of multicast configuration information to the user equipment. For the indication information, refer to the foregoing descriptions in which the indication information may be implicit or explicit, and details are not described herein again.

In an optional implementation, a solution of accelerating transmission of the multicast service data is further provided. The method further includes:

sending, by the access network device, at least one data packet in the multicast service data in the unicast manner as instructed by the user equipment; or sending, by the access network device, at least one data packet in the multicast service data in the unicast manner as indicated by the core network device; or sending, by the access network device, at least one data packet in the multicast service data in the unicast manner based on type information of the at least one data packet.

In this embodiment, in the first implementation, the user equipment specifies that the multicast service data needs to be sent in the unicast manner. In the second implementation, the core network device specifies that the multicast service data needs to be sent in the unicast manner. In the third implementation, the access network device determines that the multicast service data needs to be sent in the unicast manner. The specifying manner may be adding corresponding identifier information to the data packet in the multicast service data, and the identifier information may be specifying that the data packet needs to be sent in the unicast manner. Alternatively, the specifying manner may be specifying that a data packet of a particular type of multicast service data needs to be sent in the unicast manner. For example, it is specified that data between the latest I frame that has been sent in the multicast manner and a data frame that is being sent in the multicast manner needs to be sent in the unicast manner. Alternatively, it is specified that a single data packet of multicast service data needs to be sent in the unicast manner. In the foregoing two examples, the data in the former example may be attributed to data required for starting a service corresponding to the multicast service, so that the user equipment can start the service corresponding to the multicast service as soon as possible, for example, start video playing. The latter example may correspond to various application scenarios such as data retransmission and timely transmission of important data.

In an optional implementation, an implementation solution in which the multicast service data is sent at a protocol layer in the multicast manner and/or the unicast manner is further provided. The at least one data packet is multicast service data that has been sent in the multicast manner and that is buffered in the access network device, or multicast service data that has been sent in the multicast manner and that is received from a multicast service data source.

In this embodiment, the multicast service data sent in the unicast manner may be retransmitted. Therefore, a segment of data may be buffered first, and whether there is a retransmission request feedback is waited for. If there is no retransmission request feedback, the data may be deleted. Therefore, the buffered multicast service data herein may be multicast service data within a period of time, and multicast service data that is sent a long time ago may be deleted.

After the multicast service data sent in the unicast manner is completely sent, the multicast manner may be switched to for sending the service data, or the unicast radio bearer may be kept waiting for new multicast service data that needs to be sent in the unicast manner, or notification information may be sent to a receiver to notify that the multicast service data sent in the unicast manner is completely sent. A specific notification manner may be an explicit notification manner. For example, an end indication is added to the last data packet. Alternatively, a specific notification manner may be an implicit notification manner. For example, the multicast configuration information is sent. Content executed after the multicast service data sent in the unicast manner is completely sent is not uniquely described in this embodiment of the present invention.

In an optional implementation, a multicast service retransmission method is further provided. The method further includes:

receiving, by the access network device, receiving status information sent by the user equipment, where the receiving status information is used to indicate a receiving status of the data packet in the multicast service data; and sending, by the access network device, an unsuccessfully received data packet in the multicast service data to the user equipment in the unicast manner based on the receiving status information.

In this embodiment, the receiving status information is information used to indicate the receiving status of the data packet, and the access network device is enabled to learn of the data packet that needs to be retransmitted to the user equipment. Therefore, the receiving status information has various representation forms. For example: 1. a sequence number of the data packet that needs to be retransmitted is directly notified; and 2. feedback information is sent, where the feedback information includes information about whether all data packets have been received. The foregoing two possible examples should not be understood as a uniqueness limitation on this embodiment of the present invention. A specific manner used to notify the access network device of data packets that need to be retransmitted is not uniquely limited in this embodiment of the present invention.

In an optional implementation, a solution in which the protocol layer supports sending of the multicast service data in the unicast manner is further provided. The method further includes:

sending, by the access network device, to-be-sent multicast service data to a unicast radio link control (radio link control, RLC) entity by using a packet data convergence protocol (packet data convergence protocol, PDCP) layer, and sending the to-be-sent multicast service data in the unicast manner.

A solution of sending the multicast service data in the multicast manner is not limited in this embodiment of the present invention. In this embodiment, the multicast service data is allocated to the unicast RLC at the PDCP layer, so that the multicast service data is sent in the unicast manner.

In an optional implementation, an implementation solution for facilitating retransmission is further provided. The method further includes:

replicating, by the access network device, the to-be-sent multicast service data at the packet data convergence protocol PDCP layer, and storing the to-be-sent multicast service data.

In this embodiment of the present invention, the to-be-sent multicast service data may be stored in a buffer, to respond to a possible retransmission request. Storage space may be set at the PDCP, or may be set at the RLC. This is not limited in this embodiment of the present invention.

In an optional implementation, a solution in which the protocol layer supports sending of the multicast service data in the unicast manner is further provided. The method further includes:

sending, by the access network device, to-be-sent multicast service data to a multicast radio link control RLC entity by using a multicast packet data convergence protocol PDCP layer; sending, by the multicast radio link control RLC entity, the to-be-sent multicast service data to a unicast medium access control (medium access control, MAC) entity; and sending, by the unicast medium access control MAC entity, the to-be-sent multicast service data in the unicast manner.

In this embodiment, the RLC entity allocates the multicast service data to the unicast MAC entity, so that the multicast service data is sent in the unicast manner.

According to a second aspect, an embodiment of the present invention further provides a communication method. This embodiment is implemented on a side (for example, the user equipment) that receives data sent by the foregoing access network device, and is in a correspondence with the foregoing solution implemented on the side of the access network device. For specific content, refer to the foregoing descriptions, and repeated parts are not described again in subsequent embodiments. The communication method includes:

receiving, by user equipment, indication information sent by an access network device, where the indication information is used to indicate a manner of receiving multicast service data, and the receiving manner includes a unicast manner and/or a multicast manner; and receiving, by the user equipment, the multicast service data in the unicast manner and/or the multicast manner indicated by the indication information.

In an optional implementation, the method further includes:

receiving, by the user equipment, configuration information sent by the access network device, where the configuration information is used to receive the multicast service data.

In an optional implementation, the configuration information includes:

at least one of configuration information of a multicast bearer, multicast session information corresponding to the multicast bearer, logical channel information of the multicast bearer, multicast scheduling identifier information, information about a transmission channel for sending the multicast service data in the multicast manner, information about a transmission channel for sending the multicast service data in the unicast manner, multicast logical channel information, measurement configuration information of the transmission channel of the multicast service data, and multicast-associated unicast configuration information.

In an optional implementation, the method further includes:

sending, by the user equipment, multicast service information to the access network device, where the multicast service information is used to instruct the user equipment to receive the multicast service data, and the multicast service information includes identifier information of the user equipment and identifier information of a multicast service.

In an optional implementation, the sending, by the user equipment, multicast service information to the access network device includes:
sending, by the user equipment, multicast member change information to the access network device.

In an optional implementation, the method further includes:
selecting, by the user equipment based on a quantity of user equipments that receive the multicast service data, the unicast manner and/or the multicast manner for receiving the multicast service data; or
selecting, by the user equipment based on channel measurement information of the user equipment, the unicast manner and/or the multicast manner for receiving the multicast service data.

In an optional implementation, the configuration information includes first multicast configuration information and second multicast configuration information; and
the indication information indicates that the manner of receiving the multicast service data includes the multicast manner, and the indication information indicates that the first multicast configuration information or the second multicast configuration information is used to receive the multicast service data.

In an optional implementation, the method further includes:
instructing, by the user equipment, the access network device to send at least one data packet in the multicast service data in the unicast manner.

In an optional implementation, the method further includes:
sending, by the user equipment, receiving status information to the access network device, where the receiving status information is used to indicate a receiving status of the data packet in the multicast service data; and
receiving, by the user equipment, an unsuccessfully received data packet in the multicast service data sent by the access network device.

In an optional implementation, the method further includes:
performing packet loss detection at a packet data convergence protocol PDCP layer to obtain the receiving status information.

In an optional implementation, the method further includes:
sending, by the user equipment at a unicast radio link control RLC entity, the received multicast service data to the multicast packet data convergence protocol PDCP layer.

According to a third aspect, an embodiment of the present invention further provides an access network device, including:
an indication sending unit, configured to send indication information to user equipment, where the indication information is used to indicate a manner of receiving multicast service data, and the receiving manner includes a unicast manner and/or a multicast manner; and
a data sending unit, configured to send the multicast service data in the unicast manner and/or the multicast manner indicated by the indication information.

In an optional implementation, the access network device further includes:

a configuration sending unit, configured to send configuration information to the user equipment, where the configuration information is used to receive the multicast service data.

In an optional implementation, the configuration information includes:
at least one of configuration information of a multicast bearer, multicast session information corresponding to the multicast bearer, logical channel information of the multicast bearer, multicast scheduling identifier information, information about a transmission channel for sending the multicast service data in the multicast manner, information about a transmission channel for sending the multicast service data in the unicast manner, multicast logical channel information, measurement configuration information of the transmission channel of the multicast service data, and multicast-associated unicast configuration information.

In an optional implementation, the access network device further includes:
an information receiving unit, configured to receive multicast service information sent by the user equipment or a core network device, where the multicast service information is used to instruct the user equipment to receive the multicast service data, and the multicast service information includes identifier information of the user equipment and identifier information of a multi cast service.

In an optional implementation, that the information receiving unit is configured to receive multicast service information sent by the user equipment or a core network device includes:
receiving a multicast session establishment request sent by the core network device, where the multicast session establishment request includes the identifier information of the user equipment and the identifier information of the multicast service; or
receiving multicast member change information sent by the core network device or the user equipment.

In an optional implementation, the access network device further includes:
a manner determining unit, configured to: instruct, based on a quantity of user equipments that receive the multicast service data, the user equipment to receive the multicast service data in the unicast manner and/or the multicast manner; or
receive channel measurement information sent by the user equipment, and instruct, based on the channel measurement information, the user equipment to receive the multicast service data in the unicast manner and/or the multicast manner.

In an optional implementation, the configuration information includes first multicast configuration information and second multicast configuration information; and
the indication information indicates that the manner of receiving the multicast service data includes the multicast manner, and the indication information indicates that the first multicast configuration information or the second multicast configuration information is used to receive the multicast service data.

In an optional implementation,
the data sending unit is further configured to send at least one data packet in the multicast service data in the unicast manner as instructed by the user equipment; or
send at least one data packet in the multicast service data in the unicast manner as indicated by the core network device; or send at least one data packet in the multicast service data in the unicast manner based on type information of the at least one data packet.

In an optional implementation, the at least one data packet is multicast service data that has been sent in the multicast manner and that is buffered in the access network device, or multicast service data that has been sent in the multicast manner and that is received from a multicast service data source.

In an optional implementation, the access network device further includes:
a status receiving unit, configured to receive receiving status information sent by the user equipment, where the receiving status information is used to indicate a receiving status of the data packet in the multicast service data, where
the data sending unit is further configured to send an unsuccessfully received data packet in the multicast service data to the user equipment in the unicast manner based on the receiving status information.

In an optional implementation, the data sending unit is configured to: send to-be-sent multicast service data to a unicast radio link control RLC entity by using a packet data convergence protocol PDCP layer, and send the to-be-sent multicast service data in the unicast manner.

In an optional implementation, the data sending unit is further configured to: replicate the to-be-sent multicast service data at the packet data convergence protocol PDCP layer, and store the to-be-sent multicast service data.

In an optional implementation, the data sending unit is configured to: send to-be-sent multicast service data to a multicast radio link control RLC entity by using a multicast packet data convergence protocol PDCP layer, where the multicast radio link control RLC entity sends the to-be-sent multicast service data to a unicast medium access control MAC entity, and the unicast medium access control MAC entity sends the to-be-sent multicast service data in the unicast manner.

According to a fourth aspect, an embodiment of the present invention further provides user equipment, including:
an indication receiving unit, configured to receive indication information sent by an access network device, where the indication information is used to indicate a manner of receiving multicast service data, and the receiving manner includes a unicast manner and/or a multicast manner; and
a data receiving unit, configured to receive the multicast service data in the unicast manner and/or the multicast manner indicated by the indication information.

In an optional implementation, the user equipment further includes:
a configuration receiving unit, configured to receive configuration information sent by the access network device, where the configuration information is used to receive the multicast service data.

In an optional implementation, the configuration information includes:
at least one of configuration information of a multicast bearer, multicast session information corresponding to the multicast bearer, logical channel information of the multicast bearer, multicast scheduling identifier information, information about a transmission channel for sending the multicast service data in the multicast manner, information about a transmission channel for sending the multicast service data in the unicast manner, multicast logical channel information, measurement configuration information of the transmission channel of the multicast service data, and multicast-associated unicast configuration information.

In an optional implementation, the user equipment further includes:
an information sending unit, configured to send multicast service information to the access network device, where the multicast service information is used to instruct the user equipment to receive the multicast service data, and the multicast service information includes identifier information of the user equipment and identifier information of a multicast service.

In an optional implementation, that the information sending unit is configured to send multicast service information to the access network device includes: sending multicast member change information to the access network device.

In an optional implementation,
the data receiving unit is configured to select, based on a quantity of user equipments that receive the multicast service data, the unicast manner and/or the multicast manner for receiving the multicast service data; or
select, based on channel measurement information of the user equipment, the unicast manner and/or the multicast manner for receiving the multicast service data.

In an optional implementation, the configuration information includes first multicast configuration information and second multicast configuration information; and
the indication information indicates that the manner of receiving the multicast service data includes the multicast manner, and the indication information indicates that the first multicast configuration information or the second multicast configuration information is used to receive the multicast service data.

In an optional implementation, the user equipment further includes:
an indication sending unit, configured to instruct the access network device to send at least one data packet in the multicast service data in the unicast manner.

In an optional implementation, the user equipment further includes:
a status sending unit, configured to send receiving status information to the access network device, where the receiving status information is used to indicate a receiving status of the data packet in the multicast service data, where
the data receiving unit is configured to receive an unsuccessfully received data packet in the multicast service data sent by the access network device.

In an optional implementation, the status sending unit is further configured to perform packet loss detection at a packet data convergence protocol PDCP layer to obtain the receiving status information.

In an optional implementation,
the data receiving unit is further configured to send, at a unicast radio link control RLC entity, the received multicast service data to the multicast packet data convergence protocol PDCP layer.

According to a fifth aspect, an embodiment of the present invention further provides an access network device, including a processor, a memory, and a transceiver, where the processor, the memory, and the transceiver are connected in a manner supporting communication, where
the memory stores program code; and
the processor is configured to read the program code and cooperate with the transceiver to implement the method that is performed by the access network device according to any one of the embodiments of the present invention.

According to a sixth aspect, an embodiment of the present invention further provides user equipment, including a processor, a memory, and a transceiver, where the processor, the memory, and the transceiver are connected in a manner supporting communication, where the memory stores program code; and the processor is configured to read the program code and cooperate with the transceiver to implement the method that is performed by the user equipment according to any one of the embodiments of the present invention.

According to a seventh aspect, an embodiment of the present invention further provides a storage medium, where the storage medium stores program code, the program code includes a program instruction, and when the program instruction is executed by a processor, the processor is enabled to cooperate with a transceiver to perform the method according to any one of the embodiments of the present invention.

According to an eighth aspect, an embodiment of the present invention further provides a computer program product, where the computer program product includes a program instruction, and when the program code is executed by a processor, the processor is enabled to cooperate with a transceiver to perform the method according to any one of the embodiments of the present invention.

BRIEF DESCRIPTION OF DRAWINGS

To describe the technical solutions in the embodiments of the present invention or in the background more clearly, the following briefly describes the accompanying drawings required for describing the embodiments of the present invention or the background.

DESCRIPTION OF EMBODIMENTS

The following describes the embodiments of the present invention with reference to the accompanying drawings in the embodiments of the present invention.

Figure 1A:
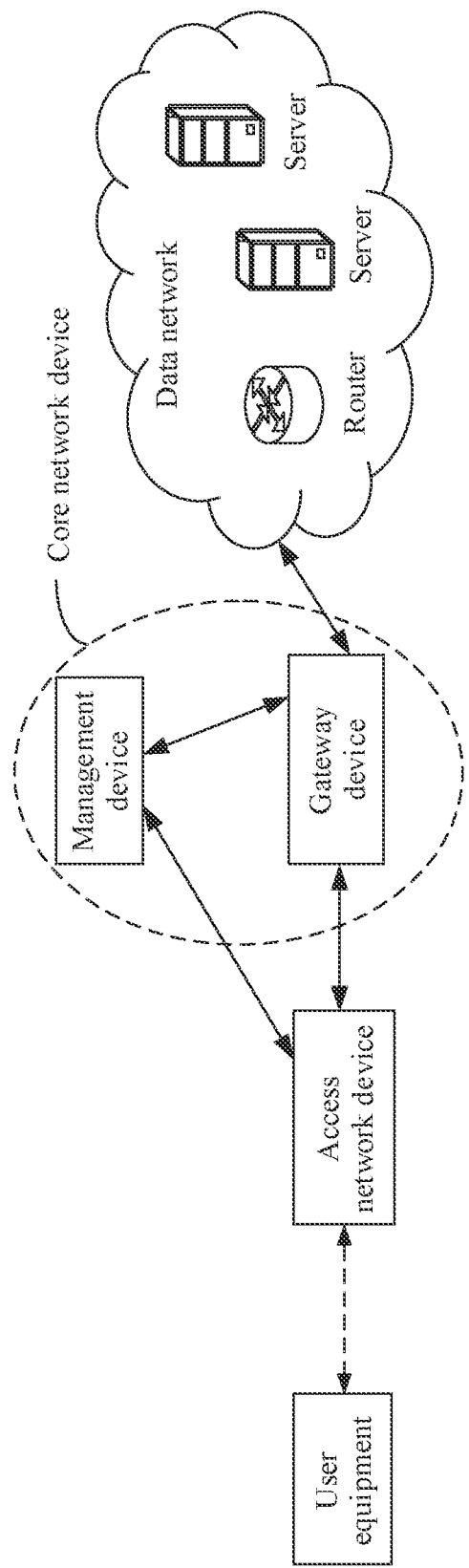
FIG. 1A is a schematic diagram of a system architecture according to an embodiment of the present invention.
Figure 1B:
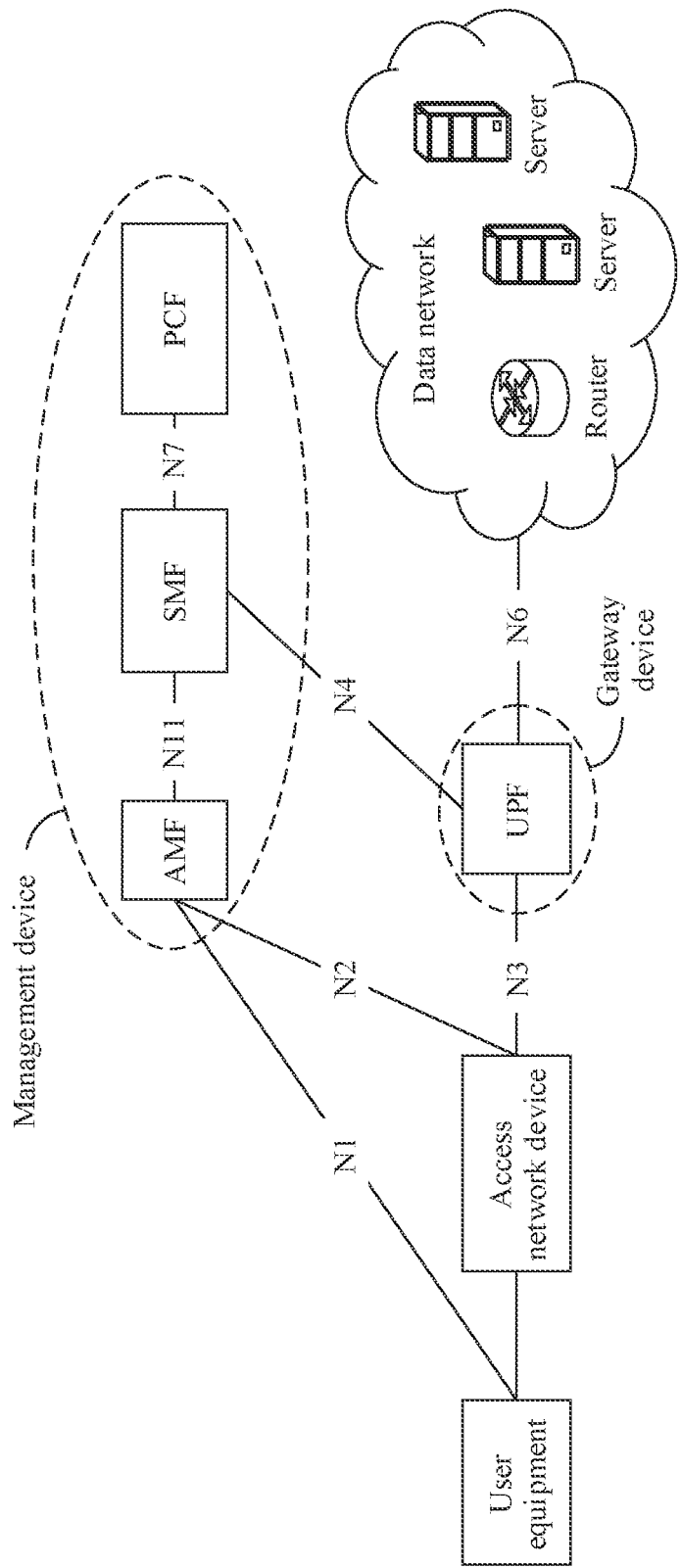
FIG. 1B is a schematic diagram of a system architecture according to an embodiment of the present invention.
Figure 1C:
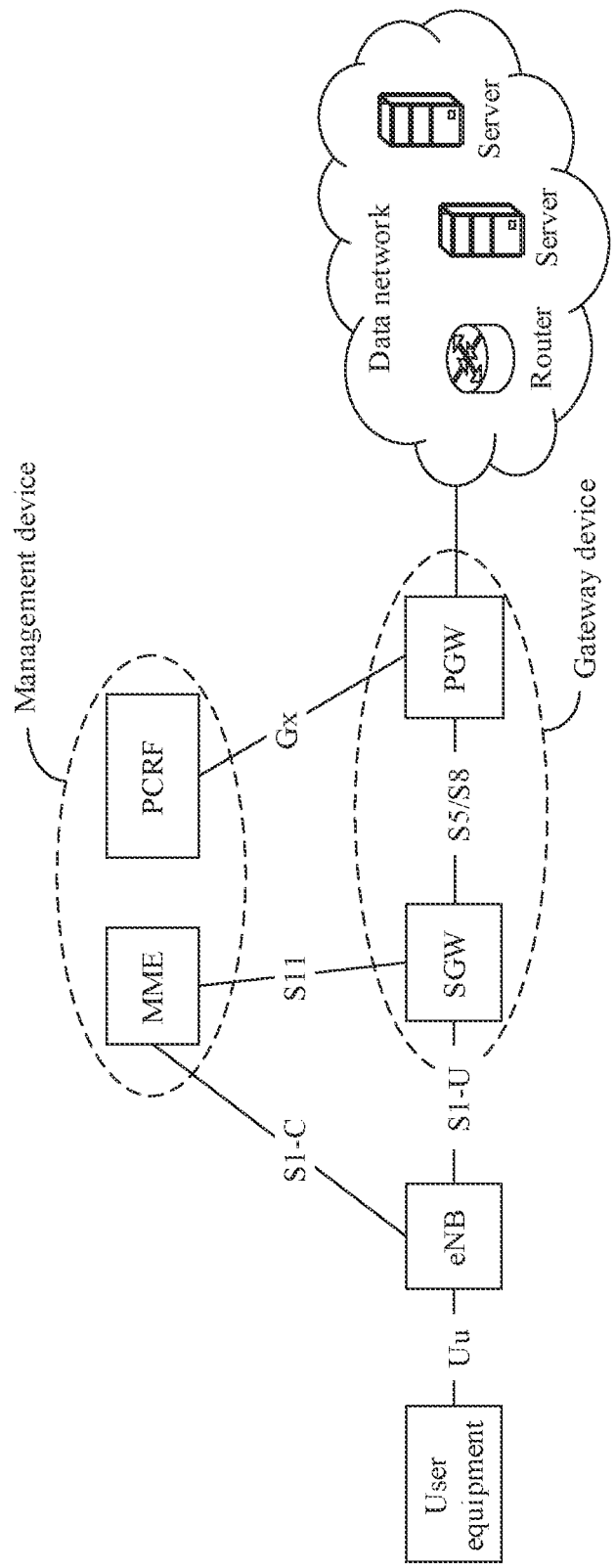
FIG. 1C is a schematic diagram of a system architecture according to an embodiment of the present invention.

FIG. 1A to FIG. 1C each are a schematic structural diagram of a communications system according to an embodiment of the present invention.

The communications system in FIG. 1A includes user equipment, an access network device, a gateway device, a management device, a router, a server, and the like. The management device and the gateway device may be classified as core network devices, and the router and the server may belong to a data network (data network, DN).

In FIG. 1A, the user equipment may be connected, by using a wireless air interface, to the access network device deployed by an operator, and then connected to the data network. The access network device is mainly configured to implement functions such as a radio physical layer function, resource scheduling and radio resource management, radio access control, and mobility management. The management device included in the core network devices is mainly used for device registration, security authentication, mobility management, location management, and the like of the user equipment. The gateway device in the core network devices is mainly configured to: establish a channel to the user equipment, and forward a data packet between the user equipment and an external data network on the channel. The data network is mainly configured to provide a plurality of data services for the user equipment. The server included in the data network may be a fast channel change (Fast Channel Change, FCC) server. FIG. 1A is merely an example architectural diagram. In addition to the functional units shown in FIG. 1A, the network architecture may further include another functional unit. This is not limited in this embodiment of the present invention.

FIG. 1B and FIG. 1C are examples of FIG. 1A.

In the communications system shown in FIG. 1B, when a communications network shown in FIG. 1A is a 5G network, the user equipment may be a mobile phone or a computer, or may be a cellular phone, a cordless phone, a session initiation protocol (session initiation protocol, SIP) phone, a smartphone, a wireless local loop (wireless local loop, WLL) station, a personal digital assistant (personal digital assistant, PDA), a computer, a laptop computer, a handheld communications device, a handheld computing device, a satellite wireless device, a wireless modem card, a set top box (set top box, STB), a customer-premises equipment (customer premise equipment, CPE), and/or another device used for communication in a wireless system. The access network device may be an access network (access network, AN)/radio access network (radio access network, RAN) device, and the access network or the radio access network is a network including a plurality of 5G-AN/5G-RAN nodes. The 5G-AN/5G-RAN node may be an access point (access point, AP), a next-generation NodeB (NR nodeB, gNB), a transmission reception point (transmission receive point, TRP), a transmission point (transmission point, TP), or another access node. The core network device may include functional units such as an access and mobility management function (access & mobility function, AMF), a session management function (session management function, SMF), a policy control function (policy control function, PCF), and a user plane function (user plane function, UPF). These functional units may work independently, or may be combined together to implement some control functions. For example, the AMF, the SMF, and the PCF may be combined together as a management device to implement access control and mobility management functions such as access authentication, security encryption, and location registration of the user equipment, and session management functions such as establishment, release, and change of a user plane transmission path, and functions of analyzing some data (such as congestion) related to a slice (slice) and user equipment-related data. The UPF mainly completes functions such as routing and forwarding of user plane data, for example, is responsible for data packet filtering, data transmission/forwarding, rate control, charging information generation, and the like for the user equipment.

FIG. 1B is a schematic diagram of a network architecture of a 5G communications system. In a 5G network shown in FIG. 1B, functional units may communicate with each other by establishing a connection between the functional units by using a next generation (next generation, NG) interface. For example, the user equipment may establish a control plane signaling connection to the AMF by using an NG interface 1 (N1 for short). The AN/RAN device, for example, a next-generation radio access NodeB (NR NodeB, gNB), may establish a user plane data connection to the UPF by using an NG interface 3 (N3 for short), and the AN/RAN device may establish a control plane signaling connection to the AMF by using an NG interface 2 (N2 for short). The UPF may establish a control plane signaling connection to the SMF by using an NG interface 4 (N4 for short), and the UPF may exchange user plane data with the data network by using an NG interface 6 (N6 for short). The AMF may establish a control plane signaling connection to the SMF by using an NG interface 11 (N11 for short). The SMF may establish a control plane signaling connection to the PCF by using an NG interface 7 (N7 for short). It should be noted that FIG. 1B is merely an example architectural diagram. In addition to the functional units shown in FIG. 1B, the network architecture may further include another functional unit. For example, the core network device may further include a unified data management (unified data management, UDM) function. This is not limited in this embodiment of the present invention.

When the communications network shown in FIG. 1A is a 4G network, for the user equipment, refer to related descriptions of the user equipment in FIG. 1B, and details are not described herein again. The access network device may be a NodeB (nodeB, NB), an evolved NodeB (evolution nodeB, eNB), a TRP, a TP, an AP, or another access unit. The core network device may include a management device such as a mobility management entity (mobility management entity, MME) or a policy and charging rules function (policy and charging rules function, PCRF), and a gateway device such as a serving gateway (serving gateway, SGW) or a PGW, and may further include a local gateway (local gateway, LGW).

For example, FIG. 1C is a schematic diagram of an architecture of a 4G network according to an embodiment of the present invention. In the 4G network shown in FIG. 1C, the user equipment may establish an air interface connection to an eNB by using a Uu interface; the eNB establishes a control plane signaling connection to the MME by using an S1-C interface, and the eNB establishes a user plane data connection to the SGW by using an S1-U interface; and the SGW establishes a control plane signaling connection to the MME by using an S11 interface, and the SGW establishes a user plane data connection to the PGW by using an S5/S8 interface. It should be noted that FIG. 1C is merely an example architectural diagram. In addition to the functional units shown in FIG. 1C, the network architecture may further include another functional unit. This is not limited in this embodiment of the present invention.

Figure 2:
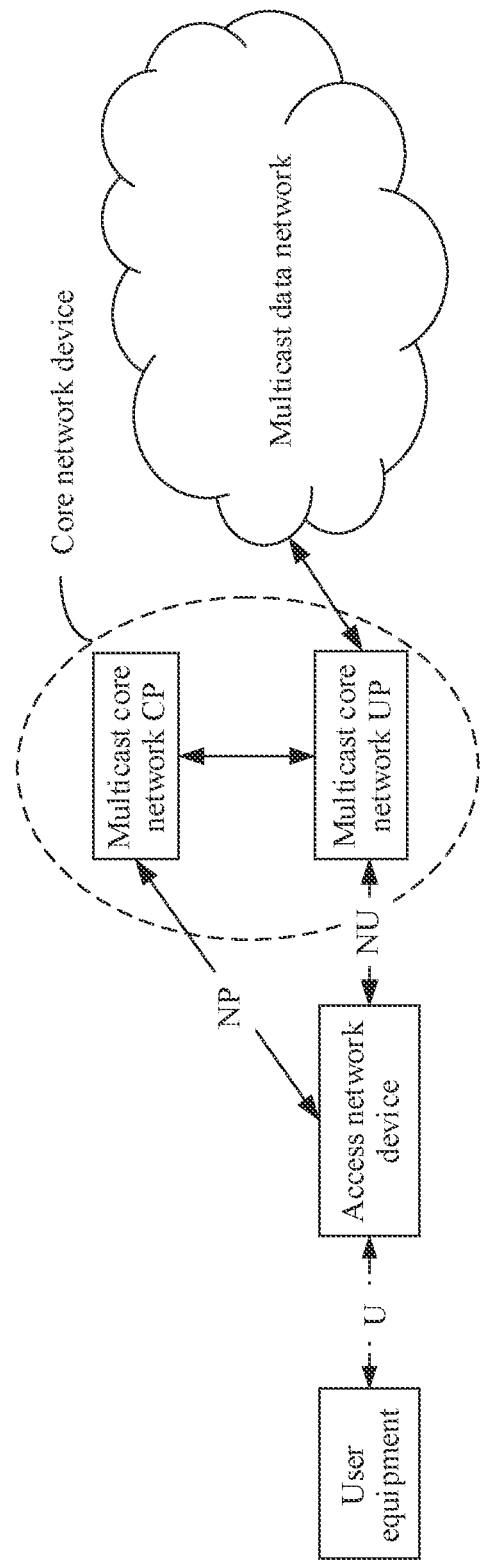
FIG. 2 is a schematic diagram of a system architecture according to an embodiment of the present invention.

To avoid loss of generality, FIG. 2 is a schematic diagram of a communications system having a multicast architecture according to an embodiment of the present invention. A core network device includes a control plane network element and a user plane network element, which are separately connected to an access network device. User equipment may be connected to the access network device by using a wireless air interface. The access network device is mainly configured to implement functions such as a radio physical layer function, resource scheduling and radio resource management, radio access control, and mobility management. The multicast core network device may include a multicast core network control plane (control plane, CP), including multicast bearer management. The multicast core network device further includes a multicast core network user plane (user plane, UP), configured to manage sending of multicast data from a multicast data network to the access network device. The multicast core network user plane may correspond to an MBMS-GW in a 4G architecture, and the multicast core network control plane may correspond to an MME in the 4G architecture. It should be noted that FIG. 2 is merely an example architectural diagram, and includes only a minimum quantity of network elements required by the multicast network architecture. Therefore, in addition to the functional units shown in FIG. 2, the network architecture may further include another functional unit.

Figure 3:
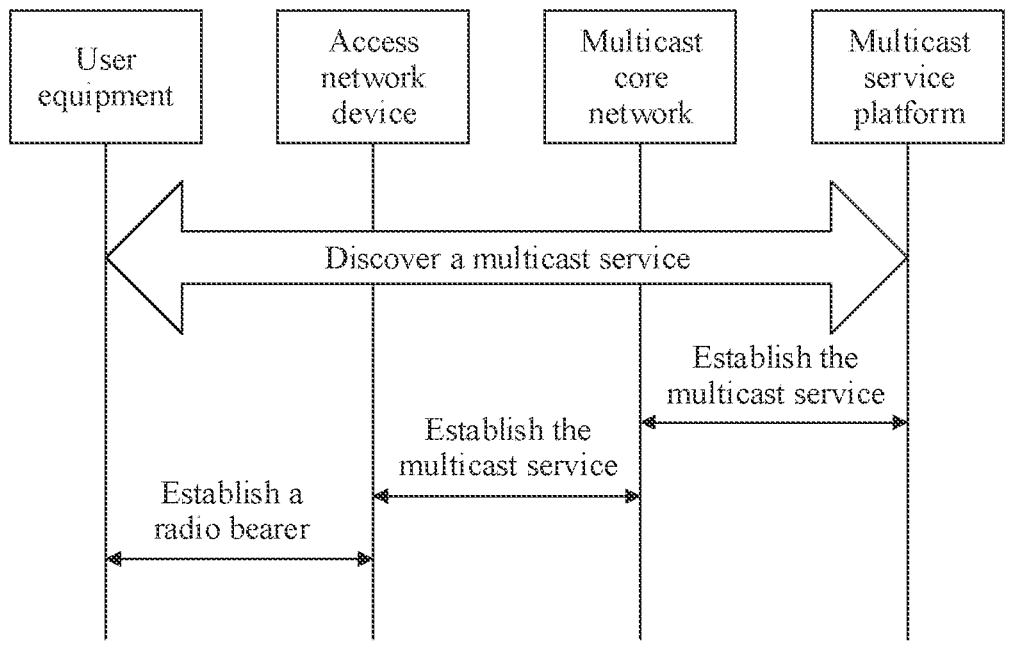
FIG. 3 is a schematic flowchart of a method according to an embodiment of the present invention.

FIG. 3 shows a process of establishing a multicast service bearer. User equipment participating in multicast may be referred to as a multicast terminal. The user equipment, an access network device, a multicast core network, and a multicast service platform first undergo a multicast service discovery process. The multicast core network exchanges multicast service information with the multicast service platform, and the access network device exchanges multicast service information with the multicast core network, so that a multicast service is established. The user equipment and the access network device determine a network resource used for multicast, and then establish the radio bearer. A specific example is as follows:

The user equipment may find the multicast service platform in the multicast service discovery process. For example, the user equipment may browse an over the top (Over The Top, OTT) website and interact with a server corresponding to the multicast service platform, to obtain multicast data. Alternatively, the user equipment may find the multicast service platform from a preconfigured address of the multicast service platform. For example, a multicast service platform is usually pre-configured in a set top box device. The user equipment interacts with the multicast service platform to obtain a multicast program list configuration. The multicast program list configuration includes multicast address information, identifier information, or the like, and specifically includes an internet protocol (internet protocol, IP) multicast address, an air interface multicast identifier, or the like. A user selects a program in the user equipment, so that the user equipment interacts with the multicast service platform, the user equipment is added as a receiver of the multicast service, and the user equipment becomes a participant of the multicast service. Compared with the foregoing process in which the user triggers the establishment of the multicast service, when the multicast service is in broadcast mode, the multicast service platform may also initiate a multicast service establishment process with the multicast core network without triggering of interaction between the multicast service platform and the user equipment. The multicast service may include a service such as group communication of trunking communication or group forwarding of internet of vehicles. A manner of establishing the multicast service in these application scenarios is similar to the foregoing OTT video or broadcast manner.

Multicast session establishment: The multicast service platform exchanges information with the multicast core network, to trigger establishment of a multicast session between the multicast core network and the multicast access network device (for example, a base station). Alternatively, the core network may receive a message indicating that the user equipment joins the multicast service, to trigger establishment of the multicast session. The multicast session may be carried by a multicast tunnel or may be identified by a multicast flow. In the former manner, the multicast tunnel is established, the multicast data is placed in the multicast tunnel and sent to the access network device, and multicast data of different multicast services (with different multicast addresses or different multicast QoS) are placed in different multicast tunnels. In the latter manner, a multicast flow identifier is carried by a multicast packet, to distinguish between different multicast services. If the multicast session has been established before the user equipment joins the multicast service (for example, another user equipment in a same access network has applied for joining the multicast service previously), the user equipment may directly join a multicast group to receive the multicast data.

Figure 4A:
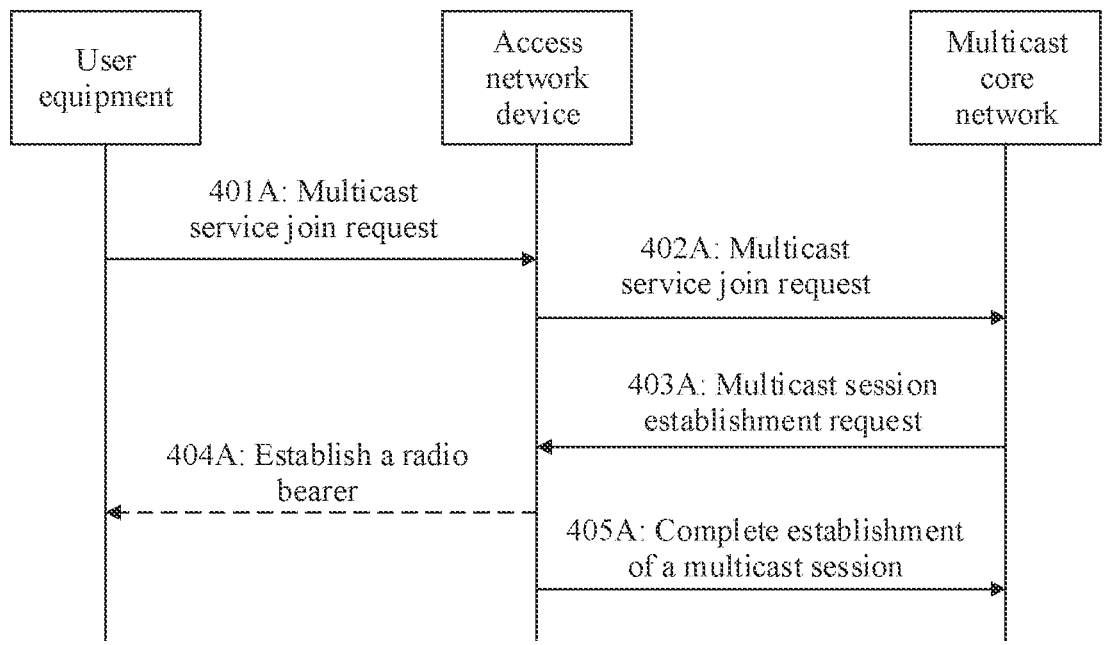
FIG. 4A is a schematic flowchart of a method according to an embodiment of the present invention.
Figure 4B:
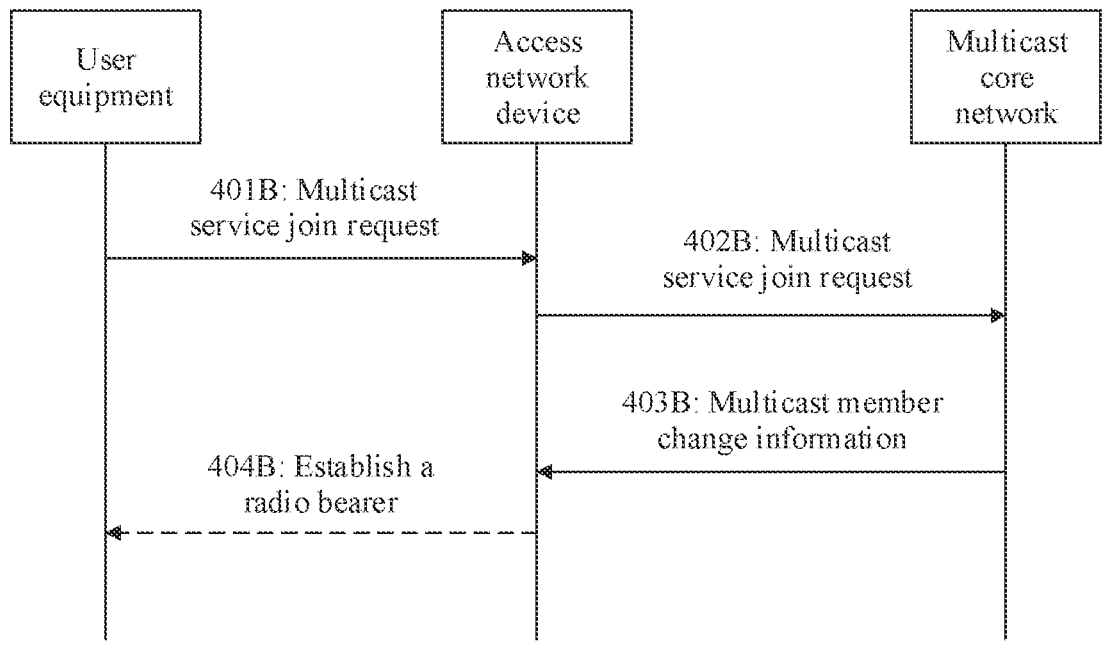
FIG. 4B is a schematic flowchart of a method according to an embodiment of the present invention.

In this embodiment of the present invention, to enable the access network device to flexibly adjust a manner of performing the multicast service based on statuses of different user equipments, the access network device needs to learn of multicast service information of the user equipment, and the multicast service information may include user identifier information and a multicast service identifier. As shown in FIG. 4A, the multicast service information may be carried by a multicast session establishment message during multicast session establishment. Alternatively, as shown in FIG. 4B, the multicast service information may be carried by a multicast join request or multicast member change information. Alternatively, as shown in FIG. 4C, the multicast service information may be carried by multicast service receiving information.

Figure 4C:
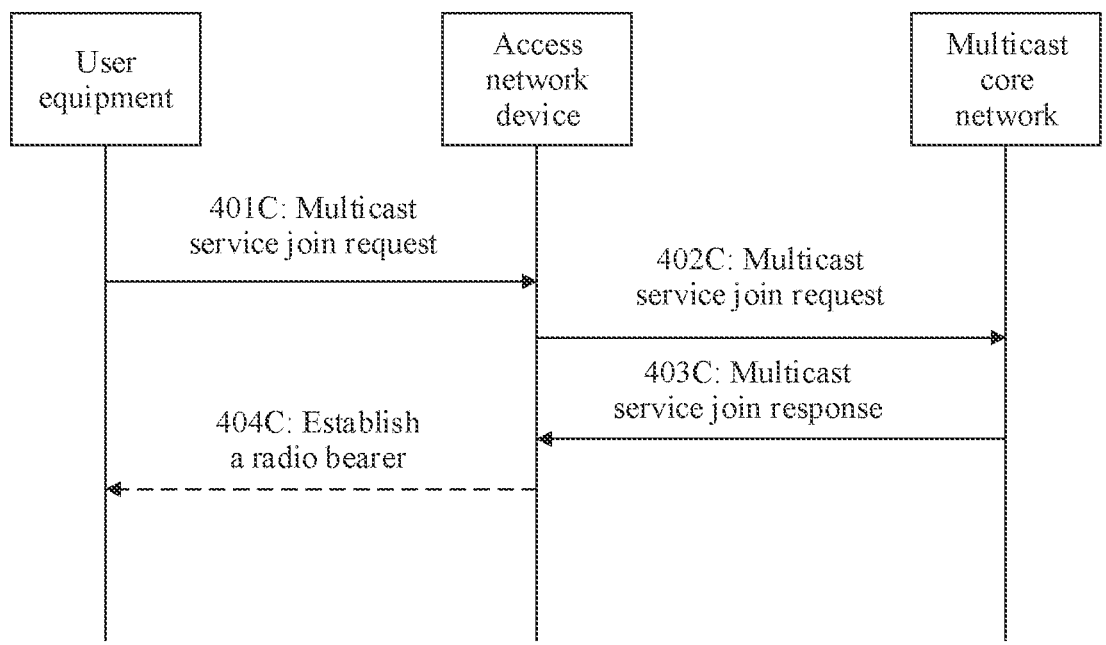
FIG. 4C is a schematic flowchart of a method according to an embodiment of the present invention.

FIG. 4A, FIG. 4B, and FIG. 4C show three different application scenarios, which are separately described below in detail.

FIG. 4A may show a scenario in which a multicast service is established for the first time. A specific procedure may include the following steps.

401A: User equipment sends a multicast service join request to an access network device.

402A: The access network device forwards the received multicast service join request to a multicast core network.

403A: The multicast core network sends a multicast session establishment request to the access network device, where the multicast session establishment request may carry multicast service information and multicast configuration information.

The multicast service information may include user identifier information and a multicast service identifier. The multicast configuration information may include information about a resource that needs to be used by the multicast service.

404A: The access network device establishes a radio bearer based on the multicast configuration information. If a radio bearer has been established between the access network device and the user equipment, and the radio bearer that has been established satisfies a requirement of a multicast configuration, this step may not be performed.

405A: The access network device sends a multicast session establishment complete message to the multicast core network.

FIG. 4B may show a procedure of changing a multicast member after a multicast service is established. A specific procedure may include the following steps.

401B: User equipment sends a multicast service join request to an access network device.

402B: The access network device forwards the received multicast service join request to a multicast core network.

403B: The multicast core network finds that the multicast service to be joined by the user equipment has been established, and sends multicast member change information to the access network device, where the multicast member change information may carry user identifier information and a multicast service identifier.

403B may alternatively be: The multicast core network finds that the multicast service to be joined by the user equipment has been established, and sends a multicast service join response to the access network device, where the multicast service join response may carry user identifier information and a multicast service identifier.

404B: The access network device establishes a radio bearer based on multicast configuration information corresponding to the multicast service to be joined by the user equipment. If a radio bearer has been established between the access network device and the user equipment, and the radio bearer that has been established satisfies a requirement of the multicast service, this step may not be performed.

In FIG. 4B, the user equipment sends the multicast service join request, and the multicast service join request may also carry the user identifier information and the multicast service identifier, so that the access network device may also learn that the user equipment is to join the multicast service corresponding to the multicast service identifier.

In the foregoing procedure, for a process in which the user equipment sends the multicast service join request to the access network device, and the access network device forwards the multicast service join request, the multicast service join request may be sent by using non-access stratum signaling, and is transparently transmitted by the access network device. In FIG. 4B, the multicast member change information may be dedicated indication information, and the dedicated indication information may include identifier information of one or more multicast member users.

FIG. 4C may show a procedure of changing a multicast member after a multicast service is established. A specific procedure may include the following steps.

401C: User equipment sends multicast service receiving information to an access network device.

The multicast service receiving information may indicate a specific multicast service that needs to be received by the user equipment. A specific manner may be that the multicast service receiving information carries a multicast service identifier. For example, the multicast service identifier is a multicast IP address of the multicast service, or similar to a temporary mobile group identity (temporary mobile group identity, TMGI) of an MBMS.

402C: After receiving the multicast service receiving information, the access network device determines, based on the multicast service identifier carried in the multicast service receiving information, a specific multicast service group to which the user equipment joins. The access network device may forward the multicast service receiving information to a multicast core network.

403C: The multicast core network may return a multicast service join response, to notify the access network device that the user equipment has joined the multicast service.

In addition, in this embodiment of the present invention, for multicast information to be obtained by the access network device, the access network device may monitor a multicast join message of the user equipment, such as an internet group management protocol (internet group management protocol, IGMP) join (join) message sent by the user equipment, to obtain a correspondence between the user equipment and the multicast service.

The access network device may select or adjust a multicast data sending manner based on statuses of different user equipments. The access network device may use an air interface wireless multicast manner, or may use an air interface wireless unicast manner, or may use an air interface wireless multicast and unicast cooperation manner. The following provides several common multicast service application scenarios.

1. Selection of a Unicast Manner or a Multicast Manner in a Semi-Static Manner

Figure 5:
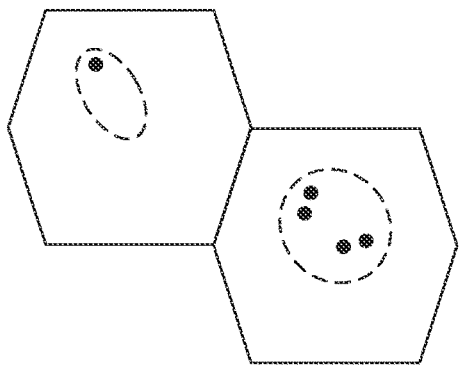
FIG. 5 is a schematic diagram of user equipment distribution according to an embodiment of the present invention.

As shown in FIG. 5, the unicast manner is used when there are a small quantity of user equipments, and the multicast manner is used when there are a large quantity of user equipments. A hexagonal area is an example of a cell. The hexagonal area may be one cell or a cell set including a plurality of cells. One black dot on the left side indicates one user equipment. Because there are a relatively small quantity of user equipments in a multicast group, to be specific, there are a relatively small quantity of user equipments participating in a multicast service, the unicast manner may be selected to be used. There are four user equipments in a multicast group on the right side, and the multicast manner may be used. An example of a specific application scenario is as follows:

(A)

In this embodiment, an example in which a unicast manner or a multicast manner is selected in a semi-static manner is used. An access network device determines, based on a quantity of user equipments of a multicast service in a multicast area, to configure whether the user equipment receives multicast data in the unicast manner or the multicast manner. Correspondingly, the access network device sends multicast service data to the user equipment in the unicast manner or the multicast manner. The access network device may alternatively configure that the user equipment may use the multicast manner and the unicast manner. This application scenario is described by using an example in the subsequent embodiments.

The multicast area may be one cell or more cells, or may similar to a plurality of single frequency network cells in an MBSFN.

The access network device may be a base station, or a centralized unit (centralize unit, CU) of a base station.

As shown in the left hexagonal area in FIG. 5, if there are a relatively small quantity of user equipments that receive the multicast service data, the access network device may configure the user equipment to receive the multicast service data in the unicast manner. In this case, the user equipment may receive scheduling information of the base station for a specific identity (identity, ID) of the user equipment, and perform corresponding data receiving and feedback. The specific ID may be a cell radio network temporary identity (cell radio network temporary identity, C-RNTI), a medium access control (medium access control, MAC) address, or another ID that can uniquely identify the user equipment.

As shown in the right hexagonal area in FIG. 5, if a quantity of user equipments that receive the multicast service data in the multicast area is greater than a specified threshold, the base station may select to send the multicast service data to the user equipment in the multicast group in the multicast manner, to save air interface resources. The base station may configure the user equipment that receives the multicast service data, so that all the user equipments can receive same scheduling information by using a same multicast ID, and receive same multicast service data on a same radio resource. The multicast ID may be, for example, a Group-RNIT, a group MAC address, a TMGI, or another similar multicast service air interface ID. The specified threshold may be preconfigured by an access network management system, or may be carried by a core network to an access network when a multicast session is established.

Figure 6:
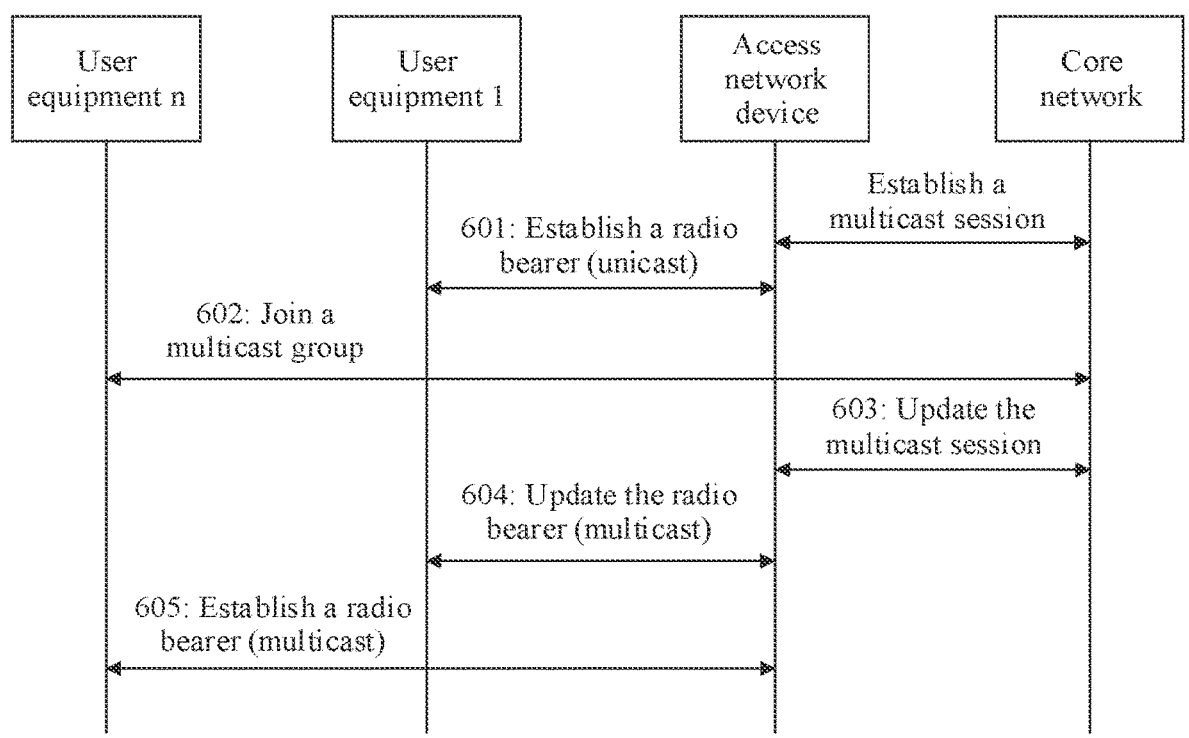
FIG. 6 is a schematic flowchart of a method according to an embodiment of the present invention.

A specific procedure is shown in FIG. 6 and may include the following steps.

601: After a multicast session is established, the access network device finds that there are a small quantity of user equipments, so that the access network device establishes a radio bearer with user equipment 1, and sends multicast data in the unicast manner, and the user equipment receives the multicast data in the unicast manner.

In step 601, the user equipment 1 is configured to receive multicast service data in the unicast manner. A configuration message may carry configuration information sent by the access network device to the user equipment. The configuration information may usually include one of the following content: a configuration of a multicast bearer, multicast session information corresponding to the multicast bearer, logical channel information of the multicast bearer, and indication information transmitted in the unicast manner. The multicast session information may include evolved packet system (evolved packet system, EPS) bearer (bearer) information or EPS flow (flow) information.

More specifically, in step 601, after the multicast session is established, because the quantity of user equipments is too small, the access network device determines, based on the small quantity of user terminals that currently receive the multicast service data, that sending efficiency is relatively high when the unicast manner is used, so that the user equipment 1 may be configured to receive the multicast service data in the unicast manner. The configuration message may carry the configuration information sent by the access network device to the user equipment, and the configuration information may include at least one of the following configuration information: bearer configuration information and resource layer configuration information.

The bearer configuration information may include at least one of the following information: a radio bearer configuration and a security configuration. The radio bearer configuration may carry one of the following information: a radio bearer ID, an evolved packet system bearer ID (bearer ID) corresponding to a multicast service, a quality of service (quality of service, QoS) flow (flow), configuration information of multicast service session information, PDCP configuration information, or RLC configuration information.

The multicast service session information may include a session identifier (session ID), a TMGI identifier, and the like. The RLC configuration information may be a corresponding acknowledged mode (acknowledged mode, AM) RLC configuration or an unacknowledged mode (Unacknowledged Mode, UM) RLC configuration, and a mapping relationship between the RLC configuration and a logical channel, to be specific, the RLC configuration may be mapped to a unicast logical channel or a multicast logical channel, or may be mapped to both a unicast logical channel and a multicast logical channel. The RLC configuration may further include an AM or UM sending manner, and information about a logical channel to which the RLC configuration is mapped, for example, information indicating that the logical channel is a multicast logical channel or a unicast logical channel, or a logical channel ID. The PDCP configuration information may include a mapping relationship between a PDCP layer and the RLC configuration (including whether the RLC configuration is mapped to only the unicast manner or the multicast manner, or in a manner combining the unicast manner and the multicast manner), and indication information indicating that the PDCP layer supports a retransmission function. The multicast logical channel includes a multicast control channel (multicast control channel, MCCH)/multicast traffic channel (multicast traffic channel, MTCH). The unicast logical channel includes a dedicated control channel (dedicate control channel, DCCH)/dedicated traffic channel (dedicated traffic channel, DTCH).

The resource layer configuration information may include a MAC layer configuration and a physical layer configuration. The physical layer configuration may include a spectrum resource configuration, and may be in a form of one or more pieces of physical cell configuration information, carrier configuration information, or carrier fragment configuration information, including a corresponding ID, a bandwidth, a subframe format, and the like. Further, the physical layer configuration may further include physical video resource configuration information of a corresponding physical channel/signal and corresponding identifier information, for example, configuration information of a unicast physical control and shared channel and a unicast scheduling identifier, or configuration information of a multicast physical control and shared channel and a multicast scheduling identifier. The unicast physical control and shared channel and the multicast physical control and shared channel may be the same or share a same physical resource. The MAC layer configuration may include a mapping relationship between a unicast or multicast logical channel and a corresponding physical channel, logical channel priority information, and HARQ configuration information.

The configuration message may further carry measurement information, for example, measurement event configuration information used for switching between the multicast manner and the unicast manner. The configuration message may further carry secure encryption/decryption information, for example, an encryption/decryption algorithm for the multicast service.

602: New user equipment joins a multicast group.

603: A core network side may send a multicast session update message to the access network device, to notify the access network device that the new user equipment joins the multicast service.

604: The access network device finds that there are n user equipments in the multicast group, and n reaches a threshold for specifying that the service data is sent in the multicast manner. If the radio bearer established in the unicast manner is not applicable to the multicast manner, the radio bearer between the access network device and the user equipment 1 may be updated.

605: The access network device establishes a radio bearer with the user equipment n, where the radio bearer is used to transmitting the data in the multicast manner.

In the foregoing procedure, after receiving the information about the increase in the quantity of user equipments of the same multicast service, the access network device determines, according to a selection algorithm of the access network device, to select the multicast manner for sending the multicast service data, and the access network device configures the corresponding configuration information for the corresponding user equipment, where the configuration information carries the corresponding multi cast configuration.

In the foregoing procedure, the access network device in step 603 and step 604 may learn of the quantity of user equipments in the multicast group. The foregoing selection algorithm may be: determining, if a threshold of a specified quantity of user equipments is reached, or based on a channel status of the user equipment, that fewer radio resources are used to send the multicast service data in the multicast manner than to send the multicast service data in the unicast manner separately, so that the access network device may determine to select the multicast manner for sending the multicast service data, and correspondingly, the user equipment receives the multicast service data in the multicast manner.

In the foregoing procedure, when the multicast radio bearer is established in step 604, the access network device may send the multicast configuration to the terminal, and the multicast configuration may usually carry one of the following content: a configuration of a multicast bearer, multicast session information corresponding to the multicast bearer, logical channel information of the multicast bearer, a multicast scheduling identifier, a configuration of a multicast transmission channel, a configuration of a multicast logical channel, measurement configuration of a multicast channel, multicast-associated unicast configuration. A multicast session may include an EPS bearer or an EPS flow, the multicast scheduling identifier may include a group radio network temporary identifier (group RNTI, G-RNTI, multicast identifier for short), the configuration of the multicast transmission channel may include a subframe or a carrier, and the configuration of the multicast logical channel may include a logical channel identifier.

A difference between the manner of receiving the multicast service data by the user equipment in the unicast manner and the manner of receiving the multicast service data by the user equipment in the multicast manner lies in a difference in monitoring of physical layer scheduling identifiers. If the user equipment receives the multicast service data in the unicast manner, the user equipment monitors and receives, based on an identifier (such as a C-RNTI) of the user equipment, scheduling signaling sent by a physical layer. If the user equipment receives the multicast service data in the multicast manner, the user equipment monitors and receives, based on a multicast identifier (such as a G-RNTI), scheduling signaling sent by a physical layer. Others such as formats or sizes of control signaling for the unicast manner and the multicast manner may also be different. The control signaling may be downlink control information (downlink control information, DCI). The user equipment may be in one of a unicast manner receiving status or a multicast manner receiving status, so that an amount of signaling that needs to be monitored and detected can be reduced. In addition, the user equipment may alternatively be in both a unicast manner receiving status and a multicast manner receiving status. In this case, the user equipment simultaneously detects unicast scheduling signaling and multicast scheduling signaling that are sent by the access network device, and receives the multicast service data on corresponding time-frequency resources as indicated by the scheduling signaling.

(B)

Figure 7:
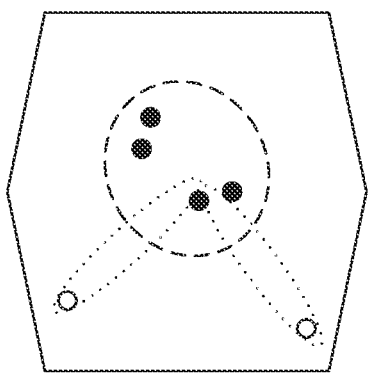
FIG. 7 is a schematic diagram of user equipment distribution according to an embodiment of the present invention.

FIG. 7 shows another application scenario of selecting a multicast manner or a unicast manner. In user equipments that receive same multicast service data, signal quality of some user equipments is relatively poor due to reasons such as being located at an edge of a cell. If all these user equipments are included in a multicast group, when sending the multicast service data in the multicast manner, an access network device needs to send the multicast data with relatively low efficiency in consideration of user equipment with the worst signal quality. This causes a decrease in overall efficiency. In this case, the access network device may group the user equipments based on channel quality of the user equipments, and designate the user equipment with good channel quality to receive the multicast service data in the multicast manner, and designate the user equipment with the poor channel quality to receive the multicast service data in the unicast manner.

A manner of obtaining the channel quality of the user equipment by the access network device may be that the access network device receives a channel measurement feedback sent by the user equipment, for example, a measurement report or a channel state information (channel state information, CSI) feedback reported by the user equipment. The user equipment designated to receive the multicast service data in the multicast manner may be user equipment whose channel quality is greater than a specified threshold. For the user equipment whose channel quality is lower than the specified threshold, the multicast manner for receiving the multicast service data may be deleted or deactivated, to avoid the decrease in the overall transmission efficiency of the multicast service data because the user equipments with the poor channel quality are enabled to successfully receive the data. For the user equipment with the relatively poor channel quality, the access network device may send the multicast service data in the unicast manner.

Figure 8:
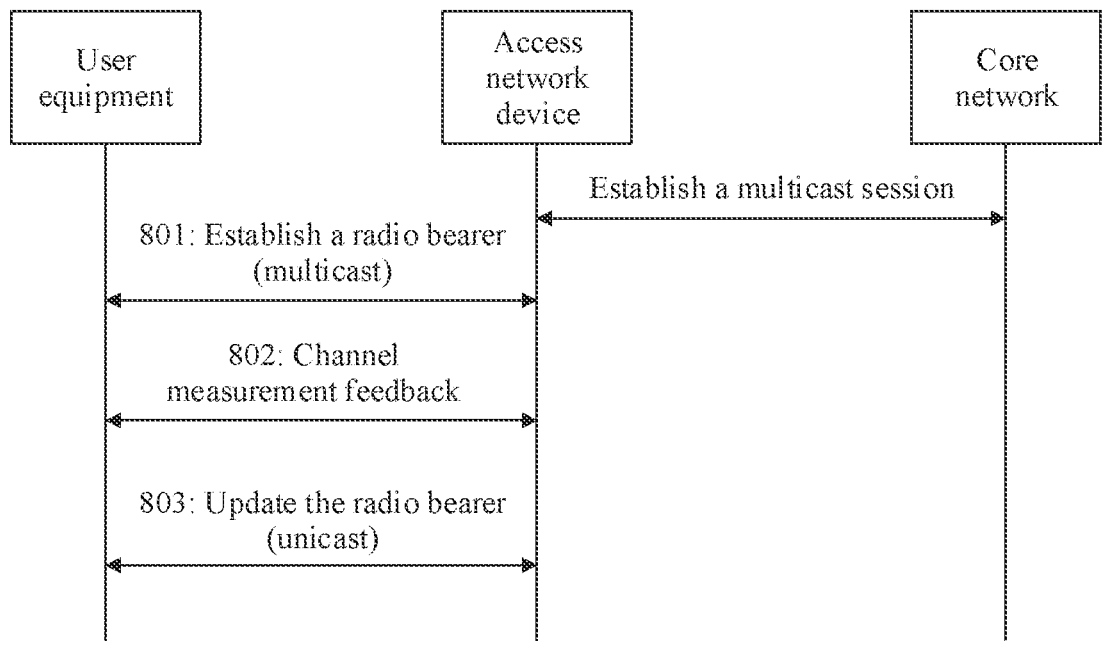
FIG. 8 is a schematic flowchart of a method according to an embodiment of the present invention.

As shown in FIG. 8, a specific procedure may be as follows:

801: After a multicast session is established, an access network device establishes a radio bearer with user equipment, where the radio bearer established for the first time may be applicable to establishment of a multicast service.

802: The user equipment sends a channel measurement feedback to the access network device.

803: The access network device finds, based on the channel measurement feedback, that channel quality of the user equipment is relatively poor, which affects overall transmission efficiency of the multicast service, and establishes, with the user equipment, a radio bearer applicable to a unicast service.

In the foregoing procedure, for a radio bearer establishment process, refer to the foregoing embodiment, and details are not described herein again. In the foregoing procedure shown in FIG. 8, in the radio bearer establishment process, only configuration information required by the radio bearer to be established may be sent. Specifically, in step 801, the access network device may send only multicast configuration information to the user equipment, and does not need to send unicast configuration information. In step 803, the access network device may send only unicast configuration information, and does not need to send multicast configuration information. In addition, if the multicast service is established for the first time, the user equipment may first perform step 802, and then determine a type of a radio bearer to be established by the user equipment. In addition, for newly added user equipment, step 801 may not be performed. In the foregoing procedure, the multicast configuration information and the unicast configuration information may alternatively be sent in step 801, and subsequently, in step 803, the user equipment is instructed to only switch to the unicast manner, or the user equipment determines that the channel quality is poor and switches to the unicast manner.

Figure 9:
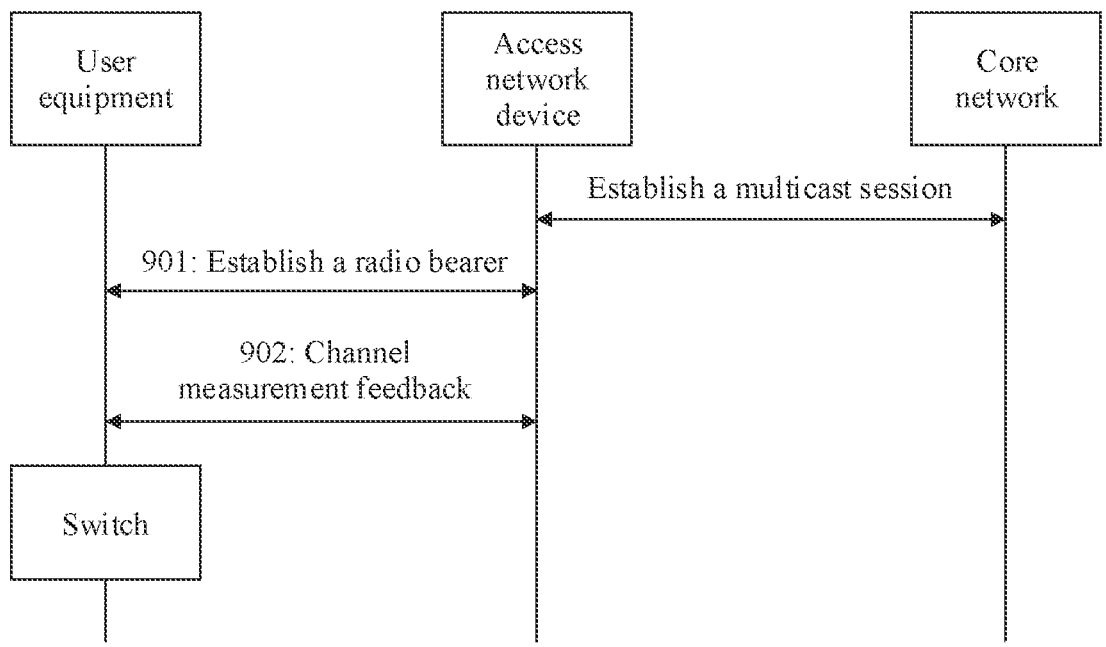
FIG. 9 is a schematic flowchart of a method according to an embodiment of the present invention.

As shown in FIG. 9, FIG. 9 is an example of an implementation of another application scenario, including the following steps.

901: After a multicast session is established or a new multicast session is established, an access network device sends information such as multicast configuration information, unicast configuration information, and a switching threshold to user equipment; and the user equipment determines, based on the switching threshold, to establish a radio bearer with the access network device.

902: The user equipment may send a channel measurement report to the access network device, to notify the access network device of channel quality of the user equipment.

Because the user equipment already knows the switching threshold, the user equipment may make a switching decision by itself. Another purpose of sending the measurement report may be to notify the access network device that the user equipment has completed the switching.

In this embodiment, the access network device sends both the multicast configuration information and the unicast configuration information to the user equipment, and may further send, to the user equipment, a measurement threshold or a measurement event condition for receiving multicast service data in a multicast manner or a unicast manner. When the user equipment determines, through measurement and based on the switching threshold, a condition for switching the receiving manner, the access network device is notified by using signaling, so that a multicast configuration or a unicast configuration is activated, a corresponding radio bearer is established, and then a corresponding receiving manner is switched to. The signaling used to notify the access network device may be the channel measurement report.

(C)

Figure 10:
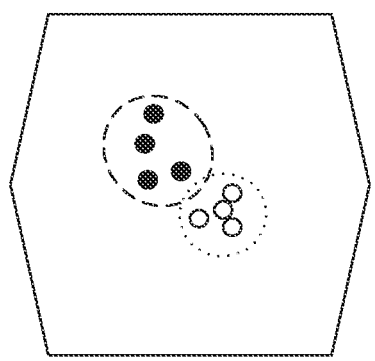
FIG. 10 is a schematic diagram of user equipment distribution according to an embodiment of the present invention.

As shown in FIG. 10, a multicast group may be divided into different sub-multicast groups. In this embodiment, multicast service data may further be grouped in a predetermined manner to improve overall transmission efficiency. Because user equipments have different directions, an access network device may cover different user equipments through different beamforming. In addition, user equipments having different moving speeds may also be grouped into different sub-multicast groups, and user equipments with different receiving capabilities may also be grouped into different groups. Different receiving capabilities may be determined by, for example, a quantity of supported antennas, such as two antennas or four antennas.

In this embodiment, the access network device may obtain information such as the receiving capability and a motion status of the user equipment by using a feedback channel of the user equipment, and reduce a difference between users in a group as much as possible through flexible grouping, thereby avoiding a decrease in multicast efficiency. To be specific, the multicast service data may be divided and sent by a plurality of sub-multicast groups, and may be sent by using an air interface based on different multicast configurations. Multicast users of different sub-multicast groups may be distinguished by configuring different multicast scheduling identifiers or multicast transmission channel configurations, to avoid resource conflicts or interference between the groups. The multicast scheduling identifier is, for example, a group RNTI; and the multicast transmission channel configuration is, for example, a subframe or a carrier.

In addition, the difference between the users in the group may also be referred to as an intra-group difference, and is a difference between the user equipments in the sub-multicast group. Because grouping is to improve transmission efficiency of the multicast service data, a reference value is usually a basis for grouping. The reference value may be, for example, the motion status in the foregoing example. User equipments with slow motions may be grouped into one group, and user equipments with fast motions may be grouped into one group. Alternatively, the reference value may be, for example, the direction of the user equipment. The user equipments may be grouped based on whether antenna beamforming of the access network device can cover the user equipment and possible channel quality division after the coverage. This difference is finally reflected by whether transmission efficiency of the sub-multicast group is reduced because impact exists between the user equipments. Usually, the smaller a difference between reference values, the smaller the impact between the user equipments.

2. Dynamic Selection of a Unicast Manner or a Multicast Manner in Hybrid Mode

In the following example, user equipment participating in receiving multicast service data may receive the multicast service data in both the multicast manner and the unicast manner. The following example focuses on dynamic adjustment of the multicast manner and the unicast manner.

(A)

Figure 11:
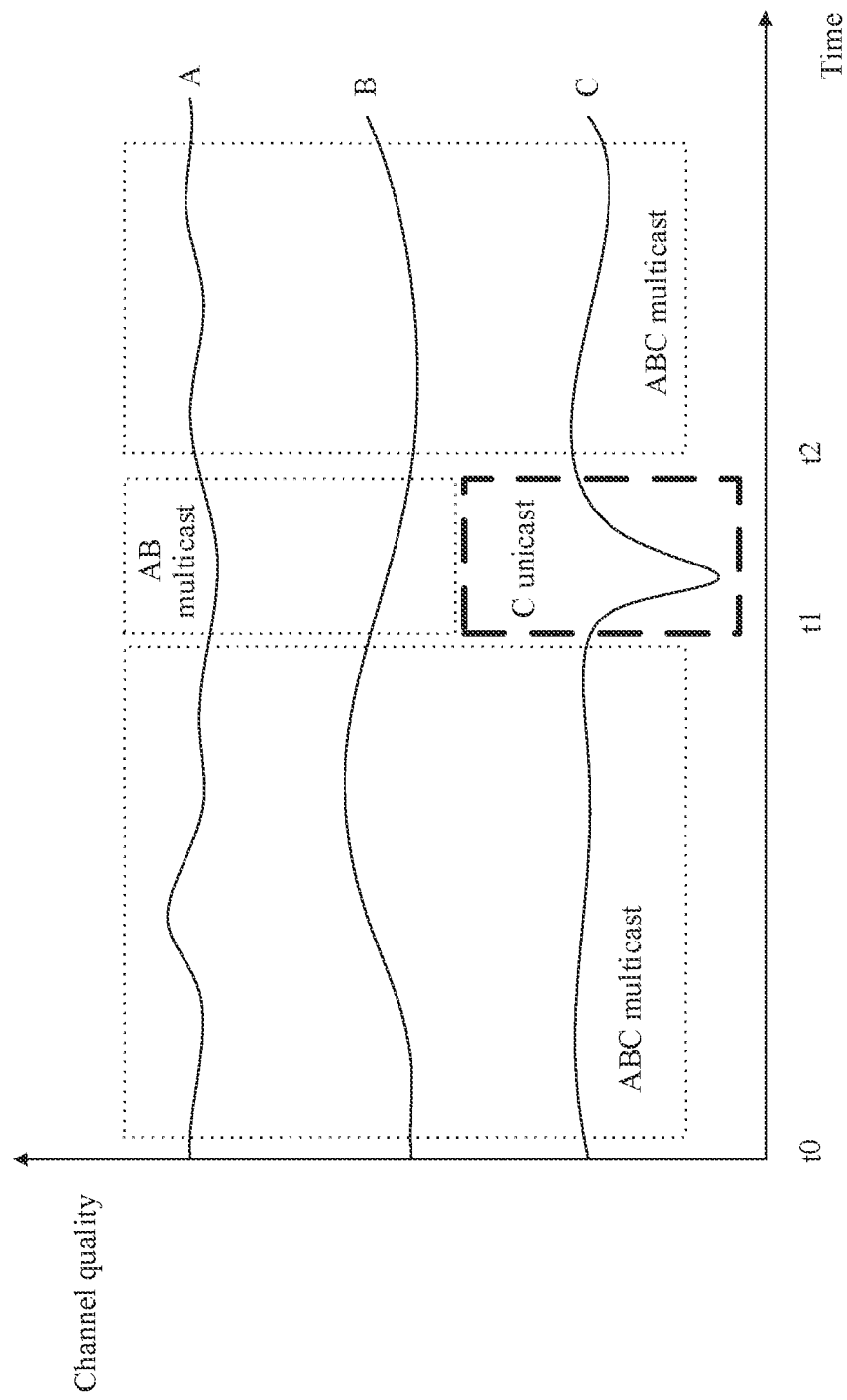
FIG. 11 is a schematic diagram of a change in channel quality of user equipment according to an embodiment of the present invention.
Figure 12:
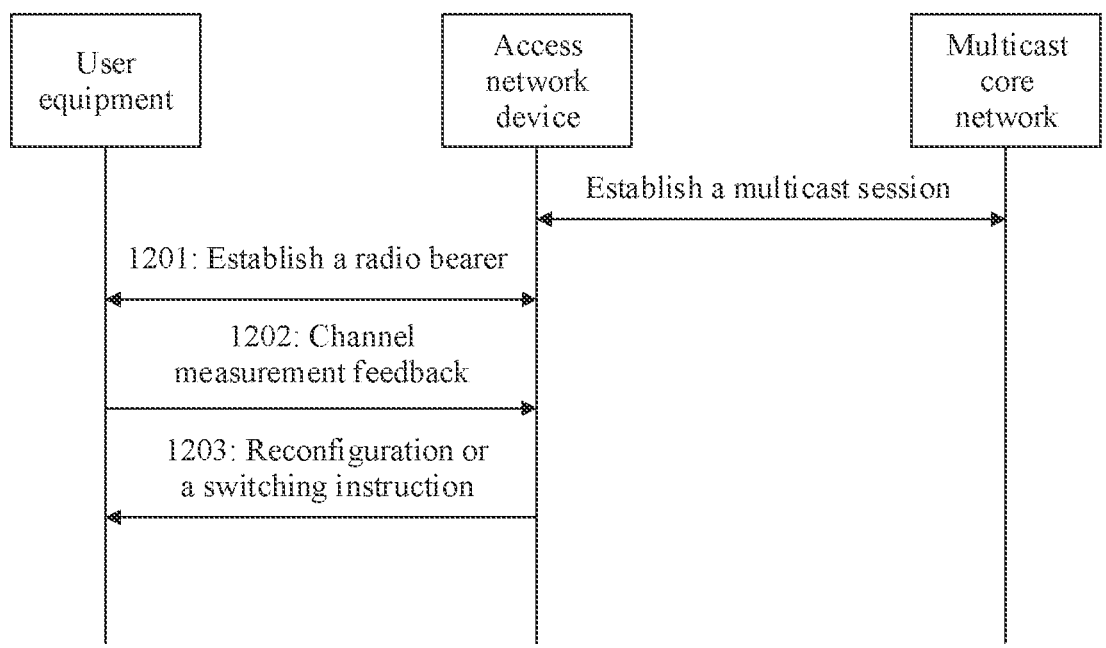
FIG. 12 is a schematic flowchart of a method according to an embodiment of the present invention.

As shown in FIG. 11, three curves A, B, and C respectively represent change statuses of channel quality in a period of time when three user equipments receive same multicast service data. In a time period t0 to t1, A, B, and C are in a phase in which the channel quality is relatively good, and an access network device sends the data to A, B, and C in a multicast manner. In a time period t1 to t2, relatively strong deterioration occurs in the channel quality of the user equipment C. The channel quality deterioration may be caused by movement, temporary signal blocking, interference, or the like, and consequently, it cannot be ensured that the multicast service data is correctly received. Receiving of the multicast service data in the unicast manner may be adjusted through hybrid automatic retransmission (hybrid automatic repeat request, HARQ), dynamic scheduling, or adaptive modulation and coding (adaptive modulation and coding, AMC), to compensate for the deterioration of the channel condition of the user equipment. Therefore, in the time period t1 to t2, the user equipment A and the user equipment B may continue to receive the multicast service data in the multicast manner, and the user equipment C may receive the multicast service data in the unicast manner. After a moment t2, the channel quality of the user equipment C is restored to a relatively good state, and the user equipment C may receive the multicast service data in the multicast manner again. A specific procedure may be shown in FIG. 12, and includes the following steps.

1201: Establish a radio bearer with user equipment after a multicast session is established.

In this step, multicast configuration information and unicast configuration information may be sent at a time, and a multicast radio bearer or a unicast radio bearer may be selected for the radio bearer. Refer to the foregoing embodiment, and details are not described herein again.

1202: The user equipment sends a channel measurement feedback to an access network device.

Herein, the channel quality feedback carries information about channel quality of the user equipment, and may be specifically a measurement report, a channel status report, or an uplink reference signal. In addition, in step 1201, a switching threshold may be specified in the configuration information. Therefore, if the user equipment determines whether to switch a manner of receiving multicast service data, the user equipment may also send receiving manner switching indication information in this step.

1203: The access network device may determine, based on the channel measurement feedback sent by the user equipment or the receiving manner switching indication information sent by the user equipment, that the user equipment switches from receiving the multicast service data in a multicast manner to receiving the multicast service data in a unicast manner, or switches from receiving the multicast service data in a multicast manner to receiving the multicast service data in a unicast manner. The access network device sends a switching instruction to the user equipment, and the user equipment switches the manner of receiving the service data.

In FIG. 11, at a moment t1, the access network device determines that the user equipment C switches from receiving the multicast service data in the multicast manner to receiving the multicast service data in the unicast manner; and at the moment t2, the access network device determines that the user equipment C switches from receiving the multicast service data in the unicast manner to receiving the multicast service data in the multicast manner.

In this embodiment, the access network device may instruct, by using signaling, the user equipment C to switch from receiving the multicast service data in the multicast manner to receiving the multicast service data in the unicast manner. In step 1203, the manner of receiving the multicast service data by the user equipment may be switched through radio bearer reconfiguration. To perform switching more quickly, and match a fast channel status change, when the multicast service is established in step 1201, the access network device sends both the multicast configuration information and the unicast configuration information to the user equipment. When the manner needs to be switched, the access network device instructs, by using the switching instruction, the user equipment to switch the manner of receiving the multicast service data, or activates a specified manner of receiving the multicast service data. The switching instruction may be, for example, sent by using a physical layer downlink control indicator (downlink control indicator, DCI) or a MAC layer control element (control element, CE).

3. Multicast and Unicast Manner Switching Triggered by a Service

In the following example, a manner of receiving multicast service data by user equipment may switch between a multicast manner and a unicast manner. In the following example, the multicast service data needs to be sent to the user equipment in the unicast manner, and subsequently, the user equipment may receive the multicast service data in the multicast manner.

Figure 13:
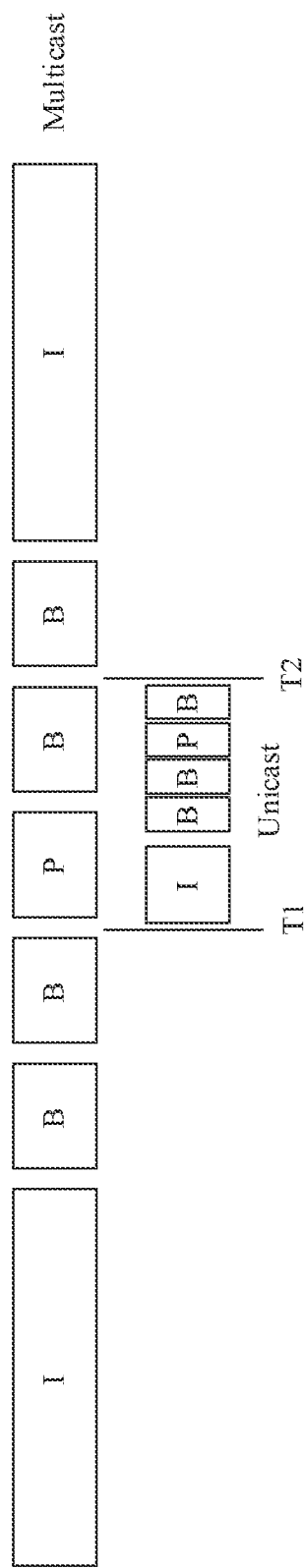
FIG. 13 is a schematic diagram in which a unicast manner and a multicast manner are cooperated according to an embodiment of the present invention.

FIG. 13 shows a scenario in which a service triggers switching of a receiving manner. Because in a multicast manner, sending and receiving are usually performed at a fixed rate, if user equipment has a specific requirement, for example, needs to receive multicast service data at a higher rate, the user equipment may interact with an access network device by using signaling, and the access network device sends the multicast service data to the user equipment in a unicast manner. As shown in the scenario marked in FIG. 12, the user equipment is receiving a video service. In a current common video encoding/decoding manner H.264/H.265, image frames are organized by using a sequence as a unit, and there are an I-frame, a B-frame, and a P-frame, where the I-frame is a full-frame compressed coded frame, and a complete image can be reconstructed during decoding by using only data of the I-frame. The B-frame and the P-frame are based on the I-frame and only a part that is different from the I-frame is transmitted. In video information, there is much same information between consecutive frames. Therefore, transmission of the same information can be reduced by using the B-frame/P-frame, thereby saving a transmission bandwidth. However, when the user equipment receives a new video, for example, clicks a new video, drags a progress bar, or switches a channel, an I-frame needs to be decoded first to successfully play the new video. In a unicast service, a server always sends data starting from an I-frame. However, in a multicast service, data is sent to a plurality of users at a same time, a newly joined user cannot ensure that when the user joins the multicast service, the user can receive a new I-frame. As shown in FIG. 13, the user equipment starts to receive the multicast service data at a moment T1, and at this moment, a previous I-frame has been sent, a next I-frame is not sent, and the user equipment cannot correctly construct a complete video frame based on a P-frame and a B-frame that are currently received. Therefore, the user equipment can be only in a black screen state, and cannot immediately start to play a video. In this case, the user equipment may instruct the access network device to send the multicast service data in the unicast manner, to send, at a relatively high rate, an I-frame and the B-frame that are not received before, so that the user equipment can immediately start to play the video. When a data frame received by the user equipment in the unicast manner is greater than or equal to a sequence number of a current multicast data frame, the user equipment may release a unicast resource, and switch back to the multicast manner to receive the multicast service data.

Figure 14:
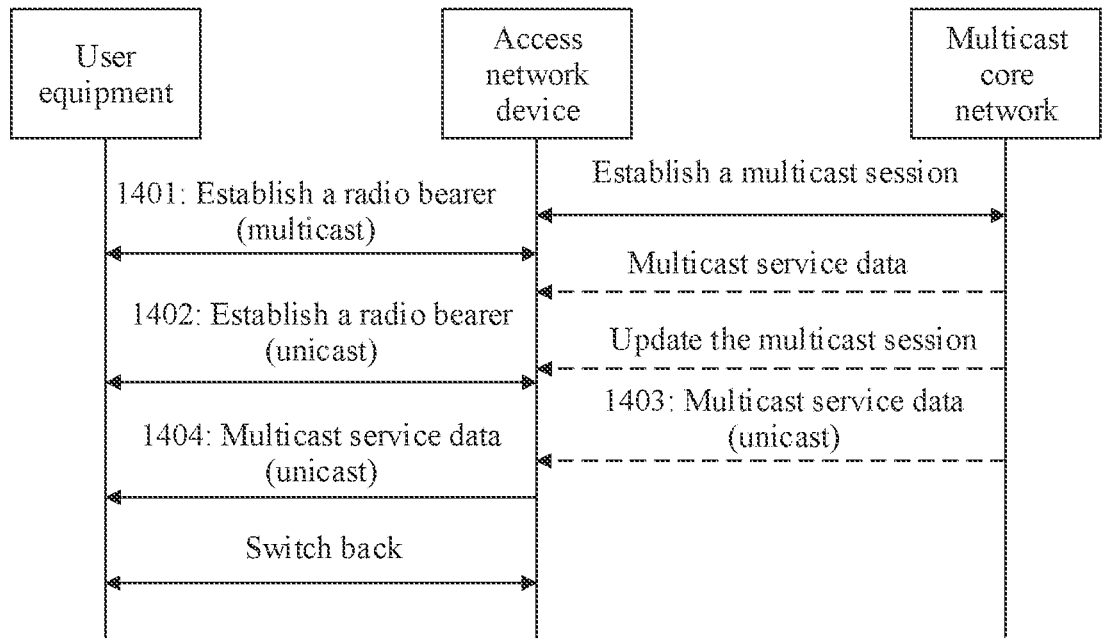
FIG. 14 is a schematic flowchart of a method according to an embodiment of the present invention.

A core network device may distinguish between data packets of different types by using tags in headers of the data packets, and the access network device may send the multicast service data based on indication information of the core network device, and buffer the multicast service data for a time. When new user equipment joins a multicast group or original user equipment starts to receive the multicast service data, the access network device may first send a segment of the multicast service data in the unicast manner. The multicast service data may be buffered by the access network device previously, and a sent start data packet may be within a period of time or start from a latest special type of data packet. If the access network device does not buffer the multicast service data that needs to be sent in the unicast manner, the multicast service data sent in the unicast manner may be sent by the core network device to the access network device. In a process of establishing or updating a multicast session, a unicast sending channel is established between the core network device and the access network device, to send the multicast service data. After the multicast service data that needs to be sent in the unicast manner is sent, the access network device or the user equipment switches back to the multicast manner to receive the multicast service data. In the foregoing scenario in which the core network device sends the multicast service data to the access network device, a core network may notify an access network of when to end sending of the multicast service data in the unicast manner, and separate signaling or a special identifier (for example, an end marker of a GTP-U) in a data packet may be used to indicate that sending of the multicast service data in the unicast manner ends. Similarly, the access network device may also instruct, by using dedicated signaling or an end data packet identifier, the user equipment to switch back to the multicast manner to receive the multicast service data. A video playing scenario is used as an example. For a specific process, refer to FIG. 14. The process includes the following steps.

1401: After a multicast session is established, user equipment joins a multicast group, or user equipment switches to receive multicast service data in a multicast manner, and establishes a radio bearer applicable to receiving the multicast service data in the multicast manner.

In this step, the user equipment may be user equipment that newly joins the multicast group, or may be existing user equipment in the multicast group.

1402: An access network device determines that a part of the multicast service data needs to be sent to the user equipment in a unicast manner, and establishes a radio bearer with the user equipment, to send the multicast service data in the unicast manner.

A manner in which the access network device determines that the multicast service data needs to be sent to the user equipment in the unicast manner may include: specifying, by a core network device in protocol headers of data packets, that some data packets, such as a B-frame and a P-frame, need to be sent in the unicast manner; or the access network device parses a received data packet, and if finding that the data packet is a B-frame or a P-frame, the access network device determines that the data packet needs to be sent in the unicast manner.

1403: The access network device sends, to the user equipment, the multicast service data that needs to be sent in the unicast manner.

The multicast service data sent by the access network device in the unicast manner may be buffered by the access network device. For example, during a process of performing a multicast service, the access network device buffers a recently sent I-frame and data between the I-frame and a next I-frame that is not received, and uses the buffered data as the multicast service data that needs to be sent in the unicast manner. Alternatively, the multicast service data may be data obtained from a source end of the multicast service. How to specifically obtain the multicast service data that needs to be sent in the unicast manner is not uniquely described in this embodiment of the present invention.

1404: After sending the multicast service data that needs to be sent in the unicast manner, the access network device switches the radio bearer between the access network device and the user equipment back to the radio bearer used to receive the multicast service data in the multicast manner.

A switching manner may be sending, by the access network device, a switching instruction to the user equipment, or may be reconfiguring the radio access bearer, to enable a newly established radio bearer to be adapted to send the service data in the multicast manner.

1405: The access network device sends the multicast service data to the user equipment in the multicast manner.

4. Service Continuity Assurance During Switching of a Manner of Sending Multicast Service Data When the multicast manner is switched to the unicast manner, to ensure continuity of a multicast service, after switching to the unicast manner, user equipment may notify, by using a data packet number, an access network device of a data packet that starts to be sent in the unicast manner. For example, the access network device may be notified of a sequence number of a last successfully received data packet, or a sequence number of a next data packet that needs to be received; or the access network device may be notified by using a PDCP status report, where the PDCP status report is used to indicate that in data packets from a sequence number N to a sequence number M, an identifier of a data packet that is successfully received by the user equipment is 1, and an identifier of a data packet that is not successfully received is 0. Based on information sent by the user equipment, the access network device sends, in the unicast manner, a data packet that is not received by the user equipment, to ensure service continuity of the user equipment.

5. Cooperation Between a Unicast Manner and a Multicast Manner in a Hybrid Sending Manner:

The unicast manner and the multicast manner can be switched to each other and can cooperate with each other. Currently, multicast service data is transmitted in the multicast manner without feedback information, and cannot be retransmitted. Therefore, a multicast service can be transmitted only in a relatively conservative robust transmission manner, to ensure that a terminal can successfully receive the multicast service data once in most scenarios. Because the conservative transmission manner needs to sacrifice resource efficiency, in the multicast enhancement solution of this application, a feedback mechanism of user equipment participating in a multicast service may be introduced. After the user equipment in a multicast group fails to receive multicast service data, an access network device retransmits the multicast service data. In this embodiment of the present invention, the multicast service data may be retransmitted in the unicast manner.

Figure 15:
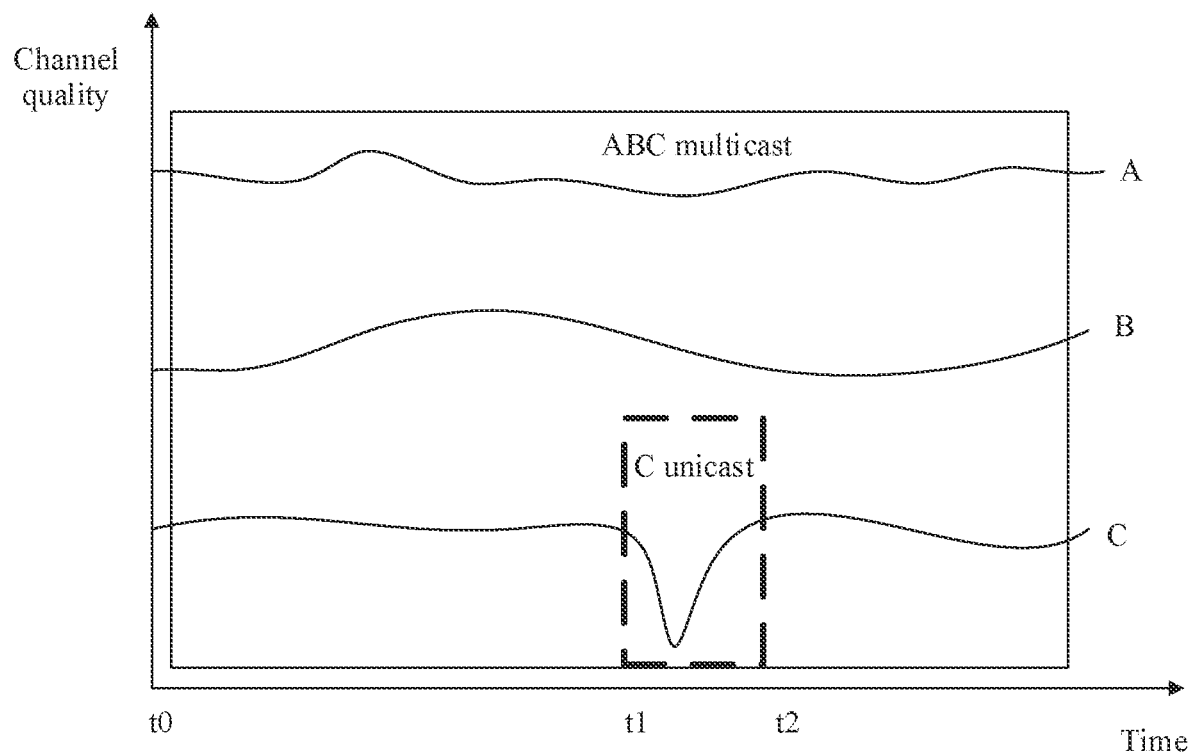
FIG. 15 is a schematic diagram of a change in channel quality of user equipment according to an embodiment of the present invention.
Figure 16:
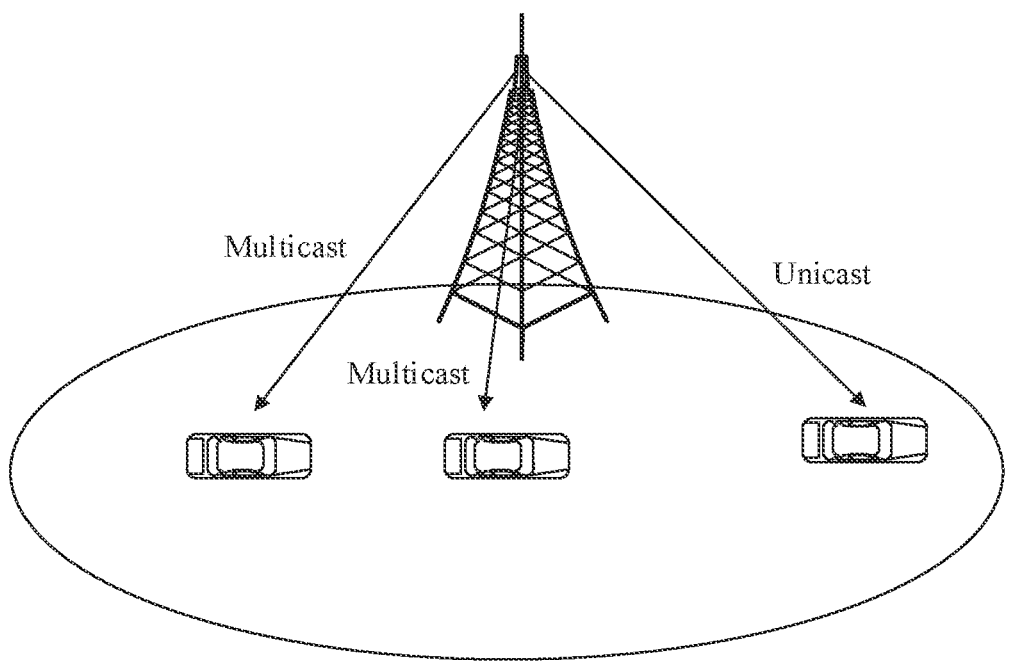
FIG. 16 is a schematic diagram of a system in which a unicast manner and a multicast manner are cooperated according to an embodiment of the present invention.

As shown in FIG. 15 and FIG. 16, each of A, B, and C represents user equipment in a multicast group. Channel quality of the user equipment C deteriorates from T1 to T2, for example, the user equipment C enters a cell edge or a channel is blocked, so that the user equipment C fails to receive multicast service data. The user equipment C may notify, by using feedback information, an access network device of a data packet that needs to be retransmitted. In a process of retransmitting a data packet, the user equipment may receive the multicast service data in both a multicast manner and a unicast manner. With assistance of the unicast manner, reliability of the multicast manner can be higher, and the multicast service data can be sent in a more efficient multicast manner.

A manner in which the user equipment notifies the access network of the data packet that needs to be retransmitted may be specifically as follows:

The user equipment specifies, by using a fixed relationship between feedback information and a retransmitted data packet, for example, a manner of sending a NACK by using a physical layer feedback channel, that the access network device retransmits, in the unicast manner, a data packet sent in an $(n-k)^{th}$ subframe, where n is a subframe for sending the NACK. Alternatively, the user equipment may explicitly indicate, by using an explicit data packet number, for example, an RLC or PDCP status report, that one or more data packets whose sequence numbers are (sequence number x, SNx) needs to be retransmitted.

In the foregoing embodiments, several typical scenarios and procedures in which the multicast service is related to the air interface transmission are described by using examples. The following embodiments focus on describing user plane protocol stack structures of the access network device and the user equipment in a centralized manner.

Figure 17:
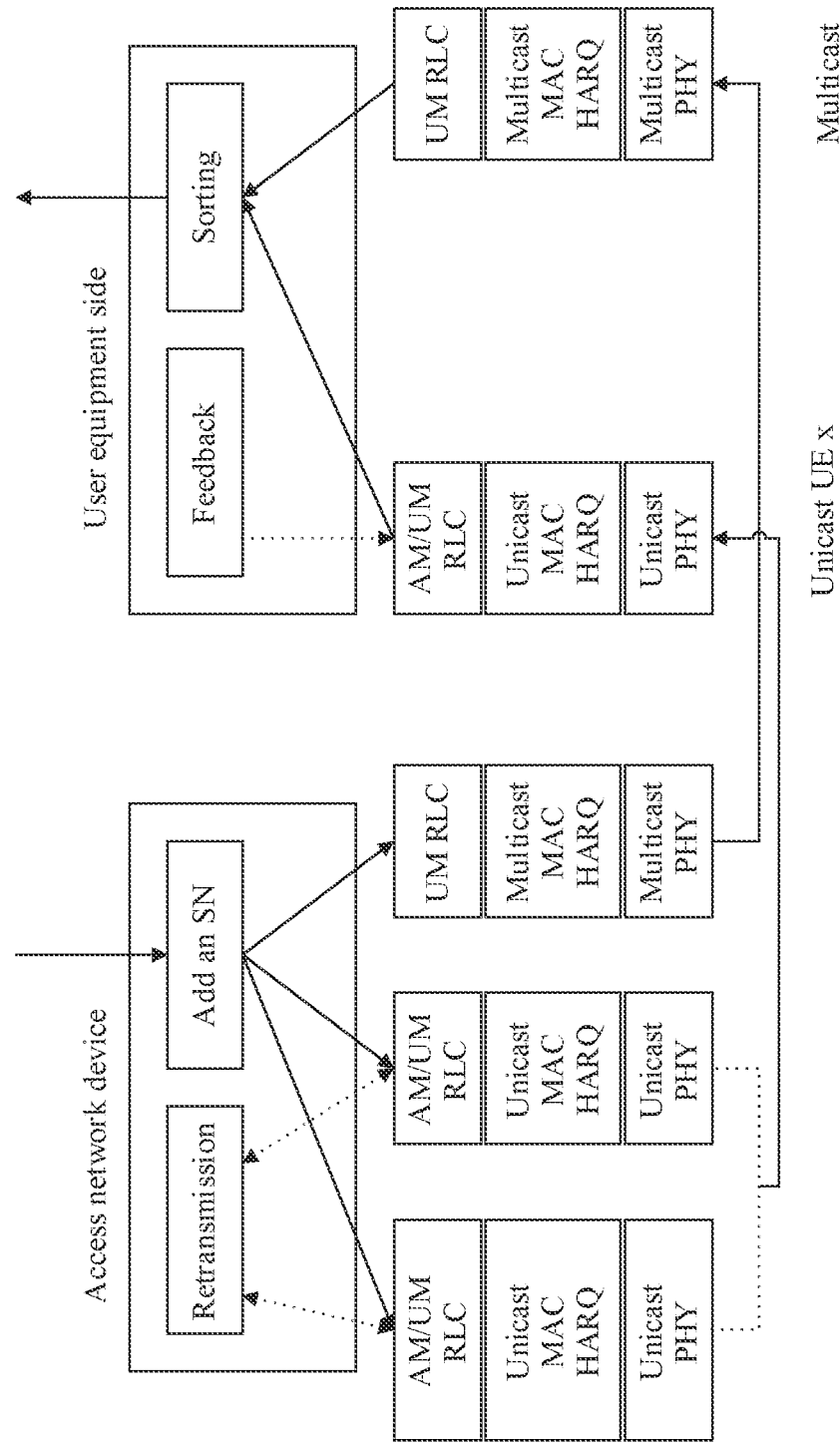
FIG. 17 is a schematic structural diagram of a protocol stack according to an embodiment of the present invention.
Figure 18A:
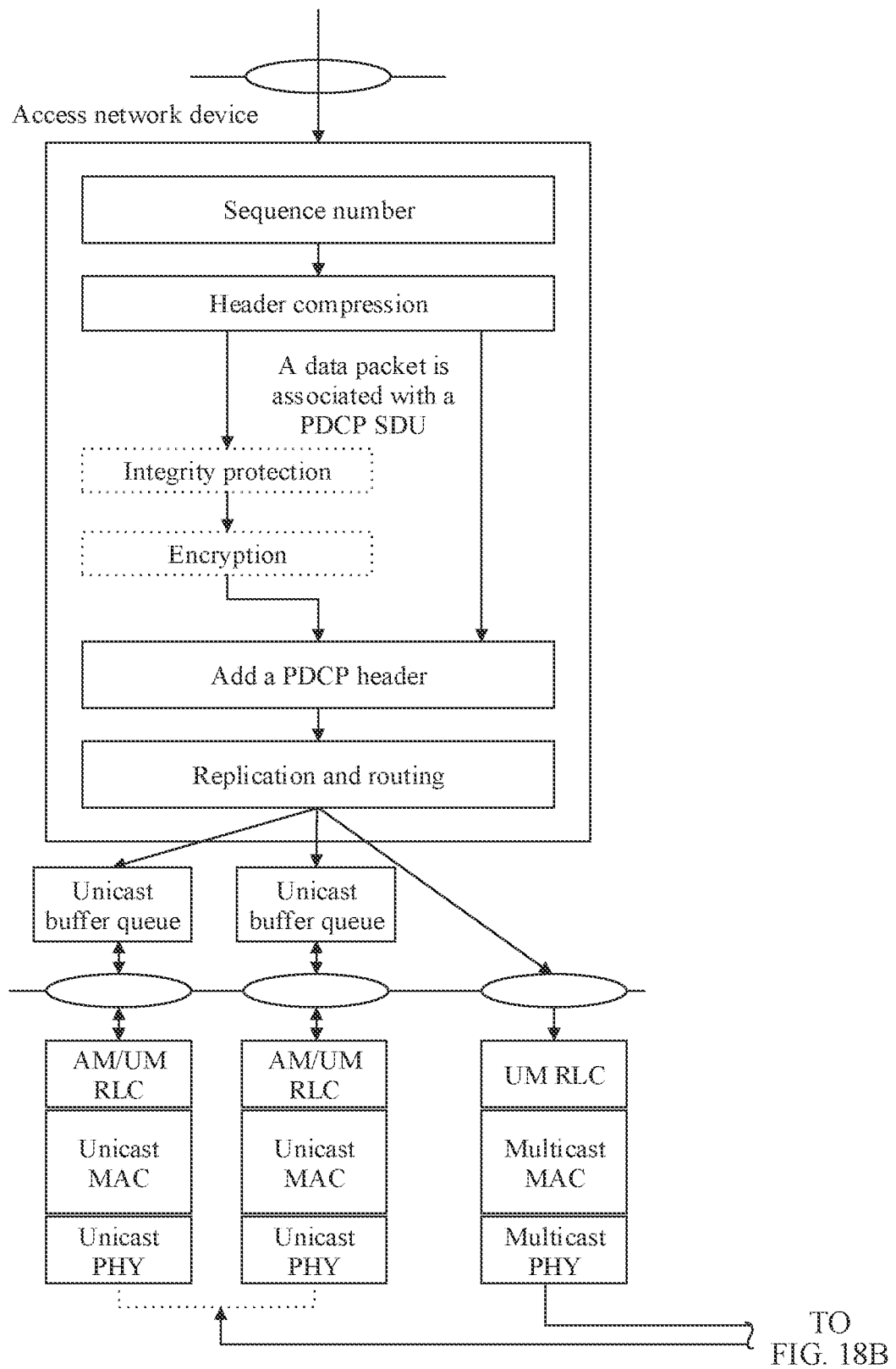
FIG. 18A and FIG. 18B are a schematic structural diagram of a protocol stack according to an embodiment of the present invention.
Figure 18B:
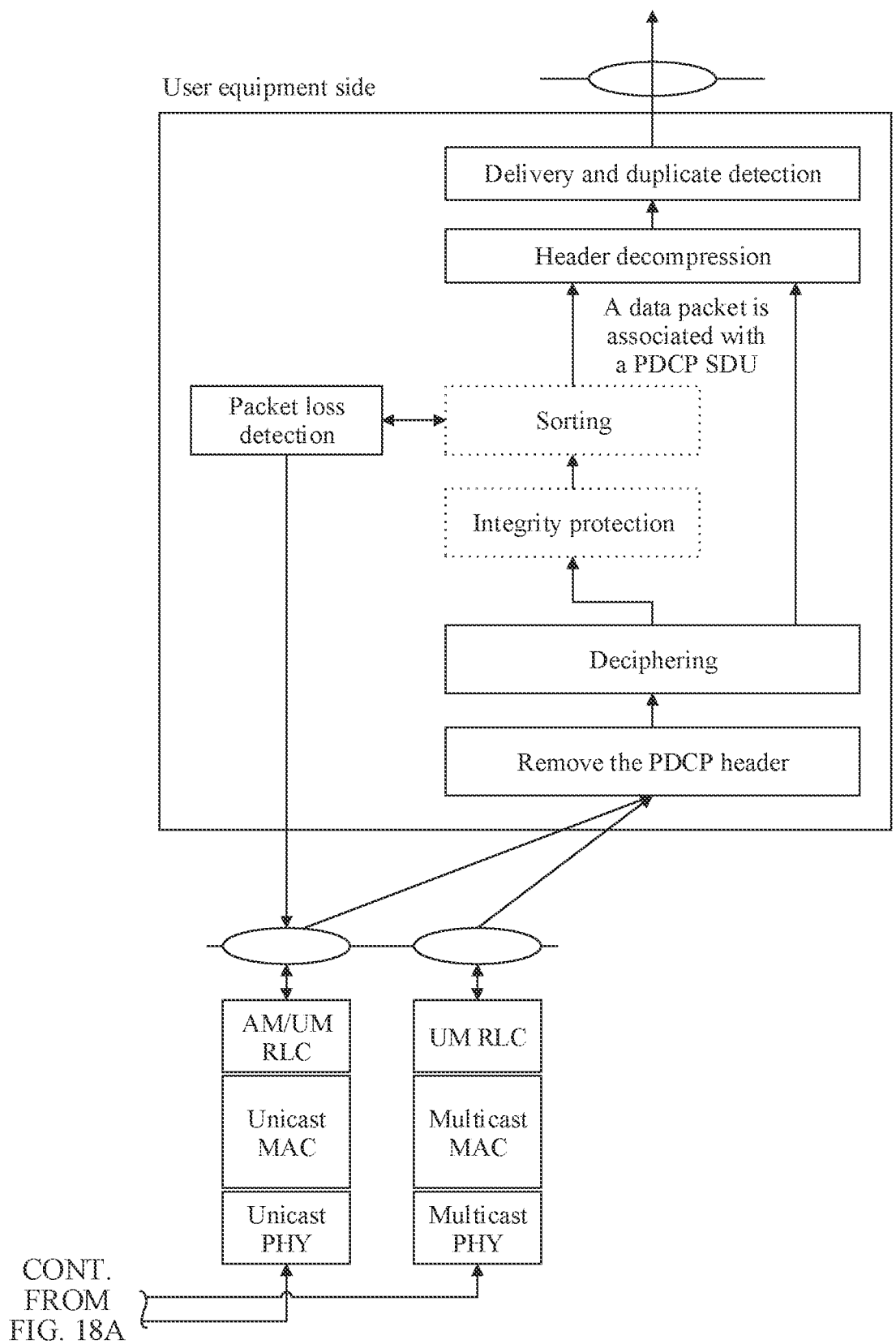

FIG. 17 and FIG. 18A and FIG. 18B show protocol stack structures for implementing multicast and unicast cooperation at a PDCP layer, including a protocol stack structure on a transmit side of a multicast user plane of an access network device and a protocol stack structure in which user equipment 1 to user equipment n are used as a receive side. For a service interface of an RLC layer, refer to multicast- and unicast-related protocol specifications, and details are not described herein again.

The access network device establishes multicast bearers for different multicast sessions, and each multicast bearer corresponds to one multicast PDCP layer. Mapping function entities from various services to the bearer may be further added before the PDCP layer. For example, in 5G, there is an SDAP (service data adaptation protocol, service data adaptation protocol) layer above the PDCP layer, and the SDAP layer is used for mapping from a flow (flow) to the PDCP layer, and is irrelevant to a function of core content in this embodiment of the present invention, so that descriptions are omitted subsequently. The multicast PDCP adds a sequence number (sequence number, SN) to the multicast service SDU, and the SN is used by a receive side for data packet sorting and retransmission requests. The multicast PDCP layer can further encrypt a multicast data packet. The multicast PDCP layer uses a service encryption key instead of a terminal encryption key, to ensure that different users can decrypt the multicast PDCP layer. The PDCP layer may also perform header compression on a header of the data packet. Then, a PDCP header is added to the data packet, and the data packet with the PDCP header is sent to a replication and routing module. A data packets sent in the unicast manner at a bottom layer can be replicated and then buffered to a queue for processing a subsequent retransmission request. A data packet sent in the multicast manner may not need to be replicated and buffered.

After processing the data packet, the PDCP layer sends obtained packet data unit (packet data unit, PDU) data to an RLC module. Because feedback cannot be performed in the multicast manner, a multicast RLC entity may further map the data to a multicast MAC entity at the bottom layer by using a UM mode, and send, by using an independent HARQ entity and an independent scheduling identifier (such as a G-RNTI), the data on a multicast physical channel provided by a corresponding multicast physical layer. For user equipment in a unicast state, the multicast PDCP layer may send, based on member information of a multicast group, the data to a unicast RLC entity that is associated with a multicast service and that is of the corresponding user equipment. Herein, the RLC entity may select an AM mode or the UM mode, and then the RLC entity of the user equipment sends the data to a unicast MAC entity. The unicast HARQ entity of the user equipment is responsible for unicast scheduling, and sending HARQ data at a unicast physical layer.

It can be learned from the foregoing scenario descriptions that the user equipment may use the unicast manner or the multicast manner, or may use a hybrid mode in which both the unicast manner and the multicast manner work. When only one receiving or sending manner is used, the user equipment may receive the data packet by using the multicast RLC entity or the unicast RLC entity based on a configuration of the access network device, and then deliver the data packet to the multicast PDCP layer. In the hybrid mode, the multicast RLC entity and the unicast RLC entity may simultaneously submit the PDU data to the multicast PDCP layer, and the PDCP layer sorts or repeatedly determines, based on the SN, the PDU data submitted by the RLC entity. When the PDCP layer determines that a data packet is lost, for example, when SNs are inconsecutive, the PDCP layer may initiate a retransmission request, for example, notify the access network device of a missing data packet SN number by using a PDCP status report. The retransmission request is fed back to a unicast RLC entity corresponding to the access network device in the unicast manner, and is submitted by the unicast RLC entity of the access network device to the multicast PDCP layer. The multicast PDCP layer retransmits the PDU data with the corresponding SN by using the unicast RLC entity. In this way, data retransmission is complete.

Figure 19:
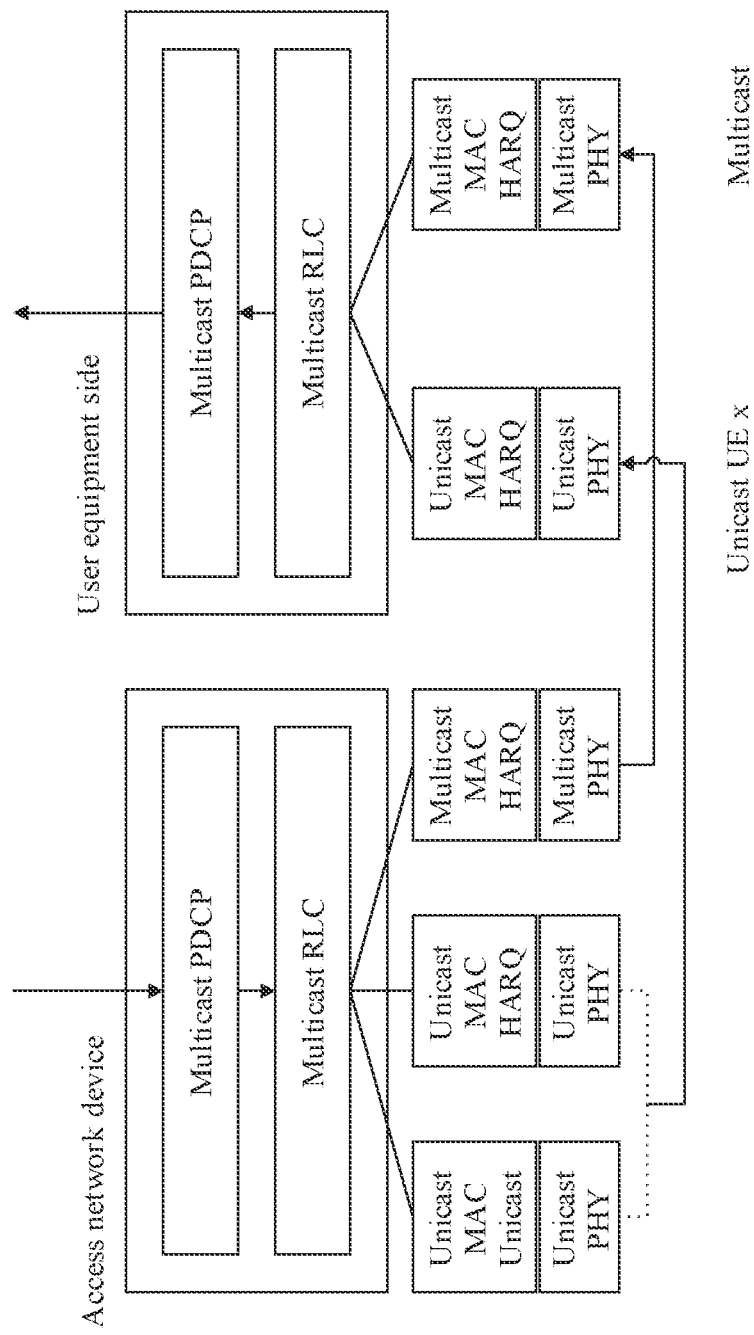
FIG. 19 is a schematic structural diagram of a protocol stack according to an embodiment of the present invention.

FIG. 19 shows a protocol stack structure in which a multicast manner and a unicast manner are switched at an RLC layer. A multicast RLC entity is responsible for segmenting a data packet, and then sends the data packet to a multicast MAC entity for sending. For user equipment that uses the unicast manner, the multicast RLC entity replicates PDU data and sends the PDU data to a unicast MAC HARQ entity corresponding to the user equipment for unicast sending. When the user equipment is in a hybrid mode and receiving in the multicast manner fails, an ARQ entity of the user equipment initiates an RLC status report, to request a multicast RLC entity of an access network device to retransmit PDU data corresponding to a missing RLC SN identifier. Compared with the method in which the switching is controlled by the PDCP layer, retransmission initiated by the multicast RLC entity may be performed at an RLC PDU granularity, thereby avoiding retransmission of entire PDCP PDU data. The entire PDCP PDU data is usually retransmitted at an IP packet granularity, and the multicast RLC entity may segment the multicast PDCP PDU data into several segments based on a resource status of an air interface, so that a problem of a waste of retransmission resources caused by a large retransmission granularity is avoided. When the user equipment requests to retransmit data, the multicast RLC entity may further segment, based on a current radio resource status of the user equipment, the RLC PDU data again that needs to be retransmitted.

The embodiments of the present invention may be applied to various radio access standards, and cooperation between the multicast manner and the unicast manner is implemented based on the PDCP layer, so that, for example, LTE multicast, NR unicast, LTE multicast, or WLAN unicast is implemented.

Figure 20:
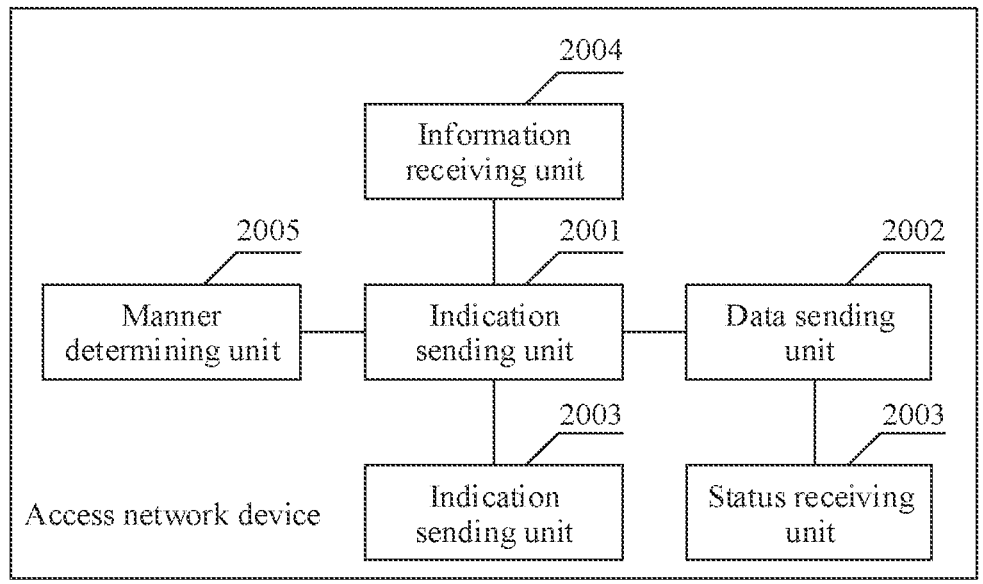
FIG. 20 is a schematic structural diagram of an access network device according to an embodiment of the present invention.

An embodiment of the present invention further provides an access network device. As shown in FIG. 20, the access network device includes:

an indication sending unit 2001, configured to send indication information to user equipment, where the indication information is used to indicate a manner of receiving multicast service data, and the receiving manner includes a unicast manner and/or a multicast manner; and a data sending unit 2002, configured to send the multicast service data in the unicast manner and/or the multicast manner indicated by the indication information.

In an optional implementation, the access network device further includes:

a configuration sending unit 2003, configured to send configuration information to the user equipment, where the configuration information is used to receive the multicast service data.

In an optional implementation, the configuration information includes:

at least one of configuration information of a multicast bearer, multicast session information corresponding to the multicast bearer, logical channel information of the multicast bearer, multicast scheduling identifier information, information about a transmission channel for sending the multicast service data in the multicast manner, information about a transmission channel for sending the multicast service data in the unicast manner, multicast logical channel information, measurement configuration information of the transmission channel of the multicast service data, and multicast-associated unicast configuration information.

In an optional implementation, the access network device further includes:

an information receiving unit 2004, configured to receive multicast service information sent by the user equipment or a core network device, where the multicast service information is used to instruct the user equipment to receive the multicast service data, and the multicast service information includes identifier information of the user equipment and identifier information of a multicast service.

In an optional implementation, that the information receiving unit 2004 is configured to receive multicast service information sent by the user equipment or a core network device includes:

receiving a multicast session establishment request sent by the core network device, where the multicast session establishment request includes the identifier information of the user equipment and the identifier information of the multicast service; or receiving multicast member change information sent by the core network device or the user equipment.

In an optional implementation, the access network device further includes:

a manner determining unit 2005, configured to: instruct, based on a quantity of user equipments that receive the multicast service data, the user equipment to receive the multicast service data in the unicast manner and/or the multicast manner; or receive channel measurement information sent by the user equipment, and instruct, based on the channel measurement information, the user equipment to receive the multicast service data in the unicast manner and/or the multicast manner.

In an optional implementation, the configuration information includes first multicast configuration information and second multicast configuration information; and the indication information indicates that the manner of receiving the multicast service data includes the multicast manner, and the indication information indicates that the first multicast configuration information or the second multicast configuration information is used to receive the multicast service data.

In an optional implementation, the data sending unit 2002 is further configured to: send at least one data packet in the multicast service data in the unicast manner according to as instructed by the user equipment; or send at least one data packet in the multicast service data in the unicast manner as indicated by the core network device; or send at least one data packet in the multicast service data in the unicast manner based on type information of the at least one data packet.

In an optional implementation, the at least one data packet is multicast service data that has been sent in the multicast manner and that is buffered in the access network device, or multicast service data that has been sent in the multicast manner and that is received from a multicast service data source.

In an optional implementation, the access network device further includes:

a status receiving unit 2006, configured to receive receiving status information sent by the user equipment, where the receiving status information is used to indicate a receiving status of the data packet in the multicast service data, where the data sending unit 2002 is further configured to send an unsuccessfully received data packet in the multicast service data to the user equipment in the unicast manner based on the receiving status information.

In an optional implementation, the data sending unit 2002 is configured to: send to-be-sent multicast service data to a unicast radio link control RLC entity by using a packet data convergence protocol PDCP layer, and send the to-be-sent multicast service data in the unicast manner.

In an optional implementation, the data sending unit 2002 is further configured to:

replicate the to-be-sent multicast service data at the packet data convergence protocol PDCP layer, and store the to-be-sent multicast service data.

In an optional implementation, the data sending unit 2002 is configured to: send to-be-sent multicast service data to a multicast radio link control RLC entity by using a multicast packet data convergence protocol PDCP layer, where the multicast radio link control RLC entity sends the to-be-sent multicast service data to a unicast medium access control MAC entity, and the unicast medium access control MAC entity sends the to-be-sent multicast service data in the unicast manner.

Figure 21:
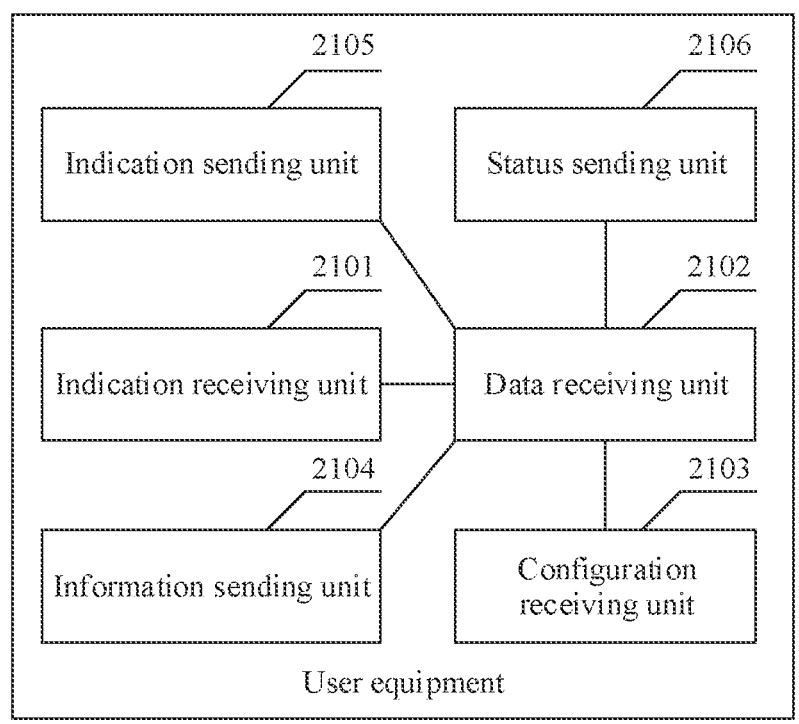
FIG. 21 is a schematic structural diagram of user equipment according to an embodiment of the present invention.

An embodiment of the present invention further provides user equipment. As shown in FIG. 21, the user equipment includes:

an indication receiving unit 2101, configured to receive indication information sent by an access network device, where the indication information is used to indicate a manner of receiving multicast service data, and the receiving manner includes a unicast manner and/or a multicast manner; and a data receiving unit 2102, configured to receive the multicast service data in the unicast manner and/or the multicast manner indicated by the indication information.

In an optional implementation, the user equipment further includes:

a configuration receiving unit 2103, configured to receive configuration information sent by the access network device, where the configuration information is used to receive the multicast service data.

In an optional implementation, the configuration information includes:

at least one of configuration information of a multicast bearer, multicast session information corresponding to the multicast bearer, logical channel information of the multicast bearer, multicast scheduling identifier information, information about a transmission channel for sending the multicast service data in the multicast manner, information about a transmission channel for sending the multicast service data in the unicast manner, multicast logical channel information, measurement configuration information of the transmission channel of the multicast service data, and multicast-associated unicast configuration information.

In an optional implementation, the user equipment further includes:

an information sending unit 2104, configured to send multicast service information to the access network device, where the multicast service information is used to instruct the user equipment to receive the multicast service data, and the multicast service information includes identifier information of the user equipment and identifier information of a multicast service.

In an optional implementation, that the information sending unit 2104 is configured to send multicast service information to the access network device includes: sending multicast member change information to the access network device.

In an optional implementation, the data receiving unit 2102 is configured to: select, based on a quantity of user equipments that receive the multicast service data, the unicast manner and/or the multicast manner for receiving the multicast service data; or select, based on channel measurement information of the user equipment, the unicast manner and/or the multicast manner for receiving the multicast service data.

In an optional implementation, the configuration information includes first multicast configuration information and second multicast configuration information; and the indication information indicates that the manner of receiving the multicast service data includes the multicast manner, and the indication information indicates that the first multicast configuration information or the second multicast configuration information is used to receive the multicast service data.

In an optional implementation, the user equipment further includes:

an indication sending unit 2105, configured to instruct the access network device to send at least one data packet in the multicast service data in the unicast manner.

In an optional implementation, the user equipment further includes:

a status sending unit 2106, configured to send receiving status information to the access network device, where the receiving status information is used to indicate a receiving status of the data packet in the multicast service data, where the data receiving unit 2102 is configured to receive an unsuccessfully received data packet in the multicast service data sent by the access network device.

In an optional implementation, the status sending unit 2106 is further configured to perform packet loss detection at a packet data convergence protocol PDCP layer to obtain the receiving status information.

In an optional implementation, the data receiving unit 2102 is further configured to send, at a unicast radio link control RLC entity, the received multicast service data to the multicast packet data convergence protocol PDCP layer.

Figure 22:
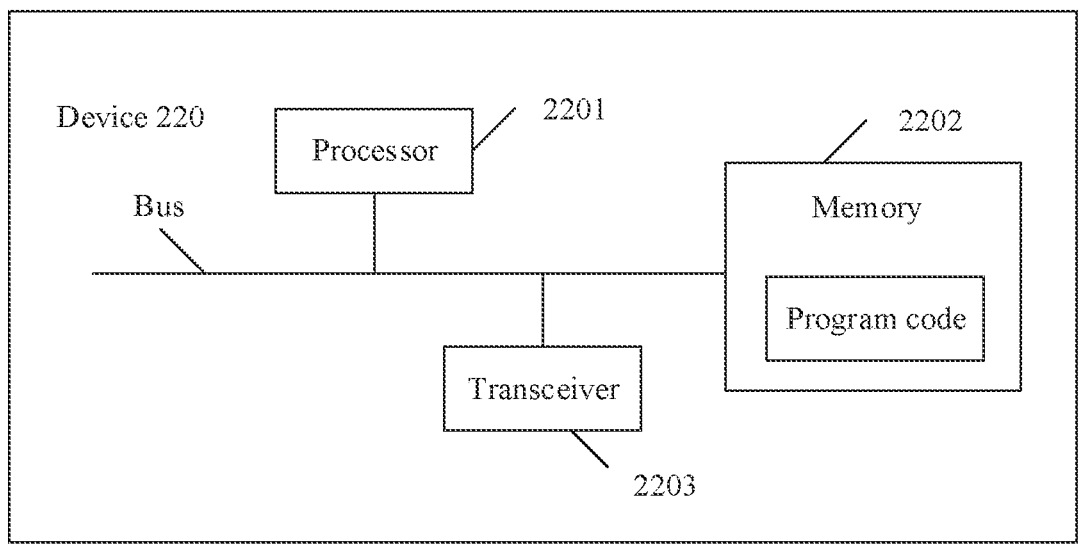
FIG. 22 is a schematic structural diagram of a device according to an embodiment of the present invention.

FIG. 22 shows a device 220 according to an embodiment of the present invention. The device 220 includes a processor 2201, a memory 2202, and a transceiver 2203. The processor 2201, the memory 2202, and the transceiver 2203 are connected to each other by using a bus.

The memory 2202 includes but is not limited to a random access memory (random access memory, RAM), a read-only memory (read-only memory, ROM), an erasable programmable read-only memory (erasable programmable read only memory, EPROM), or a compact disc read-only memory (compact disc read-only memory, CD-ROM). The memory 2202 is configured to store a related instruction and related data. The transceiver 2203 is configured to receive and send data.

The processor 2201 may be one or more central processing units (central processing unit, CPU). When the processor 2201 is one CPU, the CPU may be a single-core CPU or a multi-core CPU.

The processor 2201 in the device 220 is configured to read program code stored in the memory 2202, The memory 2202 stores program code.

The processor 2201 is configured to read the program code, and cooperate with the transceiver 2203 to implement any method performed by the access network device or the user equipment according to any one of the embodiments of the present invention. The transceiver 2203 may implement functions of various units that implement reception and transmission functions in the foregoing user equipment or the access network device, and another function is implemented by the processor 2201.

Figure 23:
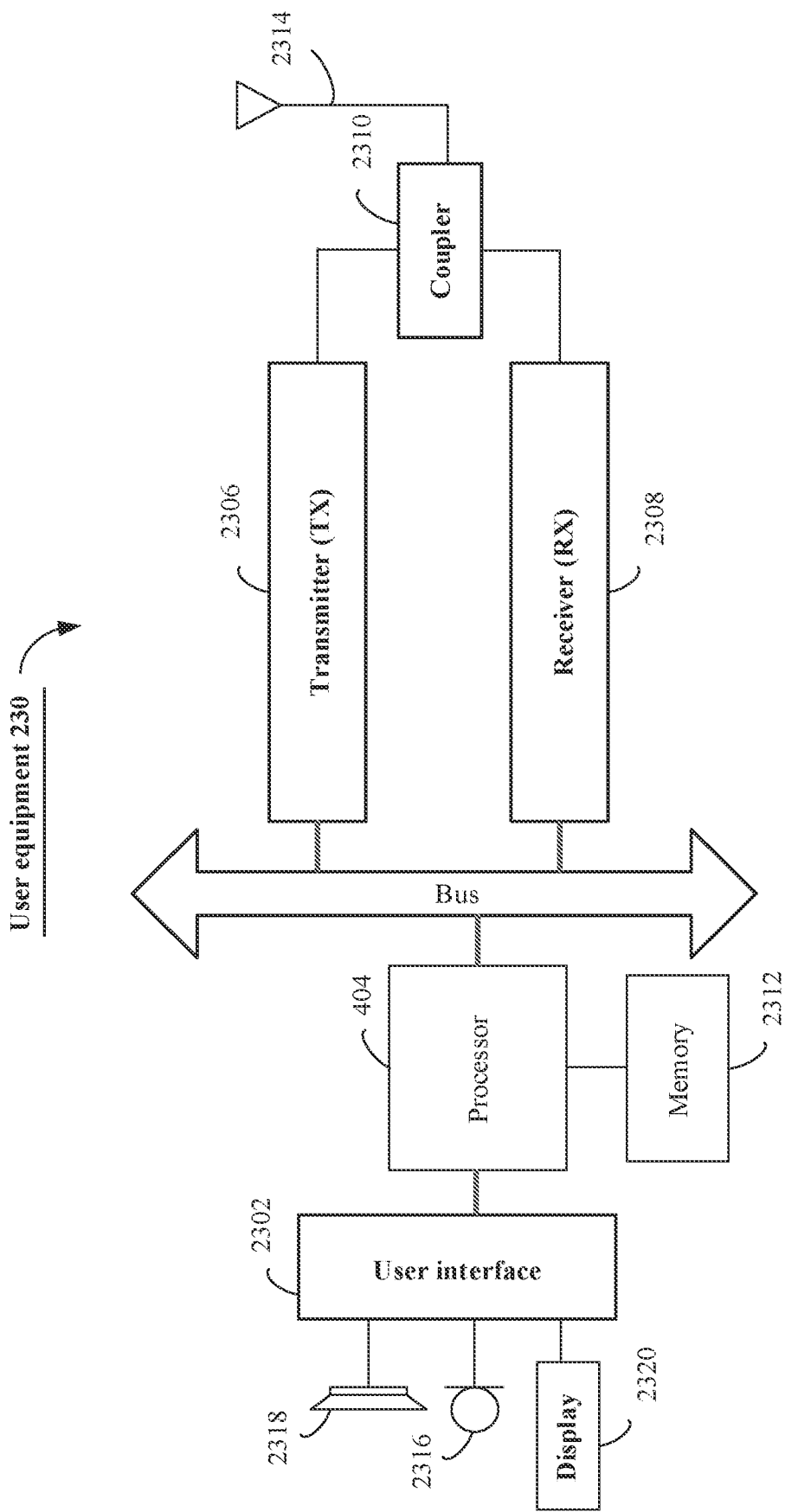
FIG. 23 is a schematic structural diagram of user equipment according to an embodiment of the present invention.

FIG. 23 shows user equipment 230 according to some embodiments of this application. As shown in FIG. 23, the user equipment 230 may include input/output modules (including an audio input/output module 2318, a key input module 2316, a display 2320, and the like), a user interface 2302, one or more processors 2304, a transmitter 2306, a receiver 2308, a coupler 2310, an antenna 2314, and a memory 2312. These components may be connected by using a bus or in another manner. In FIG. 23, an example in which the components are connected by using a bus is used.

The antenna 2314 may be configured to convert electromagnetic energy into an electromagnetic wave in free space, or convert an electromagnetic wave in free space into electromagnetic energy in a transmission line. The coupler 2310 is configured to divide a mobile communications signal received by the antenna 2314 into a plurality of signals, and allocate the plurality of signals to a plurality of receivers 2308.

The transmitter 2306 may be configured to transmit a signal output by the processor 2304.

The receiver 2308 may be configured to receive a mobile communications signal received by the antenna 2314.

In some embodiments of this application, the transmitter 2306 and the receiver 2308 may be considered as a wireless modem. In the user equipment 230, there may be one or more transmitters 2306 and one or more receivers 2308.

In addition to the transmitter 2306 and the receiver 2308 shown in FIG. 23, the user equipment 230 may further include other communications components, for example, a GPS module, a Bluetooth (Bluetooth) module, and a wireless fidelity (wireless fidelity, Wi-Fi) module. In addition to the foregoing described wireless communications signal, the user equipment 230 may support another wireless communications signal, for example, a satellite signal or a short wave signal.

The input/output modules may be configured to implement interaction between the user equipment 230 and a user/an external environment, and may mainly include the audio input and output module 2318, the key input module 2316, the display 2320, and the like. Specifically, the input/output modules may further include a camera, a touchscreen, a sensor, and the like. All the input/output modules communicate with the processor 2304 by using the user interface 2302.

The memory 2312 is coupled to the processor 2304, and is configured to store various software programs and/or a plurality of sets of instructions. Specifically, the memory 2312 may include a high-speed random access memory, and may include a non-volatile memory, for example, one or more magnetic disk storage devices, a flash memory device, or another non-volatile solid-state storage device. The memory 2312 may store an operating system (briefly referred to as a system below), for example, an embedded operating system such as Android, iOS, Windows, or Linux. The memory 2312 may further store a network communications program. The network communications program may be configured to communicate with one or more additional devices, one or more user equipments, or one or more network devices. The memory 2312 may further store a user interface program. The user interface program may vividly display content of an application program by using a graphical operation interface, and receive control operations of a user for the application program by using input controls such as a menu, a dialog box, and a key.

In some embodiments of this application, the memory 2312 may be configured to store a program for implementing, on a side of the user equipment 230, the system message receiving method according to one or more embodiments of this application. For implementation of the system message receiving method according to one or more embodiments of this application, refer to subsequent embodiments.

The processor 2304 may be configured to read and execute a computer-readable instruction. Specifically, the processor 2304 may be configured to: invoke a program stored in the memory 2312, and execute an instruction included in the program, to implement the method in subsequent embodiments.

It may be understood that the user equipment 230 may be user equipment in the communications system described above in the embodiments of the present invention, and may be implemented as a mobile device, a mobile station (mobile station), a mobile unit (mobile unit), a radio unit, a remote unit, a user agent, a mobile client, or the like.

It should be noted that the user equipment 230 shown in FIG. 23 is merely an implementation of the embodiments of this application. In an actual application, the user equipment 230 may include more or fewer components, and this is not limited herein. In this embodiment, the processor 23 may correspond to the processor shown in FIG. 22. The transmitter 2306 and the receiver 2308 may respectively correspond to units for implementing a transmission function and a reception function.

An embodiment of the present invention further provides a storage medium. The storage medium stores program code, and the program code includes a program instruction. When the program instruction is executed by a processor, the processor cooperates with a transceiver to perform the foregoing method according to any one of the embodiments of the present invention.

An embodiment of the present invention further provides a computer program product. The computer program product includes a program instruction. When the program code is executed by a processor, the processor cooperates with a transceiver to perform the foregoing method according to any one of the embodiments of the present invention.

A person of ordinary skill in the art may understand that all or some of the procedures of the methods in the embodiments may be implemented by a computer program instructing relevant hardware. The program may be stored in a computer-readable storage medium. When the program is run, the foregoing method procedures are performed. The foregoing storage medium includes: any medium that can store program code, such as a ROM or a random access memory RAM, a magnetic disk, or an optical disc.

What is claimed is:

1. A communication method for access network device, comprising:
    sending indication information to user equipment, wherein the indication information indicates a receiving manner of multicast service data, and the receiving manner comprises a unicast manner, a multicast manner or a hybrid manner, and the hybrid manner comprises the unicast manner and the multicast manner;
    if the indication information indicates that the receiving manner of the multicast service data is the unicast manner, sending multicast service data to a unicast radio link control (RLC) entity in the access network device through a multicast data convergence protocol (PDCP) layer, and sending the multicast service data in the unicast manner;
    if the indication information indicates that the receiving manner of the multicast service data is the multicast manner, sending multicast service data to a multicast radio link control (RLC) entity in the access network device through a multicast data convergence protocol (PDCP) layer, and sending the multicast service data in the multicast manner;
    if the indication information indicates that the receiving manner of the multicast service data is the hybrid manner, sending multicast service data to a multicast radio link control (RLC) entity and a unicast RLC entity in the access network device through a multicast data convergence protocol (PDCP) layer, and sending the multicast service data in the unicast manner and the multicast manner, sending, in the unicast manner, multicast service data that has been sent in the multicast manner and needs to be retransmitted.

2. The method according to claim 1, wherein the receiving manner is the hybrid manner, and the multicast service data is sent in the multicast manner and the unicast manner, the method further comprises:
    determining the multicast service data that needs to be retransmitted in one of the following ways:
    a way of transmitting negative acknowledgement (NACK) through a physical layer feedback channel, an RLC status report, or a PDCP status report.

3. The method according to claim 2, wherein the RLC status report indicates a sequence number (SN) of the multicast service data that needs to be retransmitted; or the PDCP status report indicates a SN of the multicast service data that needs to be retransmitted.

4. The method according to claim 1, wherein the method further comprises:
    sending configuration information to the user equipment, wherein the configuration information is used to receive the multicast service data,
    wherein the configuration information comprises:
    at least one of configuration information of a multicast bearer, multicast session information corresponding to the multicast bearer, logical channel information of the multicast bearer, or multicast scheduling identifier information.

5. The method according to claim 4, wherein the configuration information of the multicast bearer comprises a mapping relationship between a PDCP layer and a RLC layer of the multicast bearer, and the mapping relationship is one of the following: the PDCP layer of the multicast bearer is mapped to an RLC layer in the unicast manner, or the PDCP layer of the multicast bearer is mapped to an RLC layer in the multicast manner, and the PDCP layer of the multicast bearer is mapped to the RLC layer in the unicast manner and the RLC layer in the multicast manner.

6. The method according to claim 1, receiving multicast service information from a core network device, wherein the multicast service information comprises identifier information of the user equipment and identifier information of a multicast service.

7. The method according to claim 1, wherein
    the sending multicast service data to a unicast radio link control (RLC) entity in the access network device through a multicast data convergence protocol (PDCP) layer, and sending the multicast service data in the unicast manner comprises:
    sending the multicast service data to the unicast RLC entity through the multicast PDCP layer, and sending, by the unicast RLC entity, the multicast service data to a unicast media access control (MAC) entity, and sending, by the unicast MAC entity, the multicast service data in the unicast manner;
    the sending multicast service data to a multicast radio link control (RLC) entity in the access network device through a multicast data convergence protocol (PDCP) layer, and sending the multicast service data in the multicast manner comprises:
    sending the multicast service data to the multicast RLC entity in the access network device through the multicast PDCP layer, sending, by the multicast RLC entity, the multicast service data to a multicast media access control (MAC) entity, and sending, by the multicast MAC entity, the multicast service data in the multicast manner; and the sending multicast service data to a multicast radio link control (RLC) entity and a unicast RLC entity in the access network device through a multicast data convergence protocol (PDCP) layer, and sending the multicast service data in the unicast manner and the multicast manner comprises:
  sending the multicast service data to the multicast RLC entity and the unicast RLC entity in the access network device through the multicast PDCP layer, sending, by the unicast RLC entity, the multicast service data to a unicast media access control (MAC) entity, and sending, by the unicast MAC entity, the multicast service data in the unicast manner, sending, by the multicast RLC entity, the multicast service data to the multicast MAC entity, and sending, by the multicast MAC entity, the multicast service data in the multicast manner.

8. The method according to claim 7, wherein the multicast RLC entity corresponds to a non-acknowledgement (UM) manner, and the unicast RLC entity corresponds to an acknowledgement (AM) manner or the non-acknowledgement (UM) manner.

9. The method according to claim 1, further comprising copying the multicast service data at the PDCP layer, and storing the multicast service data.

10. The method according to claim 1, wherein
the sending the multicast service data in the unicast manner comprises: sending a unicast scheduling signaling by using a user equipment identifier (C-RNTI), wherein the unicast scheduling signaling indicates time-frequency resources of the multicast service data; and
the sending the multicast service data in the multicast manner comprises: sending a multicast scheduling signaling by using a group wireless network temporary identifier (G-RNTI), wherein the multicast scheduling signaling indicates time-frequency resources of the multicast service data.

11. A communication apparatus, comprising:
at least one processor; and
a non-transitory computer-readable medium including computer-executable instructions that, when executed by the at least one processor, cause the apparatus to carry out operations including:
receiving indication information sent by an access network device, wherein the indication information indicates a receiving manner of multicast service data, and the receiving manner comprises a unicast manner, a multicast manner or a hybrid manner, and the hybrid manner comprises the unicast manner and the multicast manner; and
if the indication information indicates that the receiving manner of the multicast service data is the unicast manner, receiving multicast service data in the unicast manner;
if the indication information indicates that the receiving manner of the multicast service data is the multicast manner, receiving the multicast service data in the multicast manner;
if the indication information indicates that the receiving manner of the multicast service data is the hybrid manner, receiving the multicast service data in the unicast manner and the multicast manner, and receiving in the unicast manner, multicast service data that has been sent in the multicast manner and needs to be retransmitted.

12. The apparatus according to claim 11, wherein the multicast service data that needs to be retransmitted is determined in one of the following ways:
  a way of transmitting negative acknowledgement (NACK) through a physical layer feedback channel, an RLC status report, or a PDCP status report.

13. The apparatus according to claim 12, wherein the RLC status report indicates a sequence number (SN) of the multicast service data that needs to be retransmitted; or the PDCP status report indicates a SN of the multicast service data that needs to be retransmitted.

14. The apparatus according to claim 11, wherein the operations further comprise:
  receiving configuration information from the access network device, wherein the configuration information is used to receive the multicast service data,
  wherein the configuration information comprises:
    at least one of configuration information of a multicast bearer, multicast session information corresponding to the multicast bearer, logical channel information of the multicast bearer, or multicast scheduling identifier information.

15. The apparatus according to claim 14, wherein the operations further comprise:
  wherein the configuration information of the multicast bearer comprises a mapping relationship between a PDCP layer and a RLC layer of the multicast bearer, and the mapping relationship is one of the following: the PDCP layer of the multicast bearer is mapped to an RLC layer in the unicast manner, or the PDCP layer of the multicast bearer is mapped to an RLC layer in the multicast manner, or the PDCP layer of the multicast bearer is mapped to the RLC layer in the unicast manner and the RLC layer in the multicast manner.

16. The apparatus according to claim 11, wherein
the receiving multicast service data in the unicast manner comprises:
  receiving, from a unicast MAC entity, the multicast service data in the unicast manner;
the receiving the multicast service data in the multicast manner comprises:
  receiving, from a multicast MAC entity, the multicast service data in the multicast manner; and
the receiving the multicast service data in the unicast manner and the multicast manner, and receiving in the unicast manner, multicast service data that has been sent in the multicast manner and needs to be retransmitted comprises:
  receiving, from the unicast MAC entity, the multicast service data in the unicast manner, and receiving, from the multicast MAC entity, the multicast service data in the multicast manner.

17. The apparatus according to claim 15, wherein the RLC layer in the multicast manner corresponds to a non-acknowledgement (UM) manner, and the RLC layer in the unicast manner corresponds to an acknowledgement (AM) manner or the non-acknowledgement (UM) manner.

18. The apparatus according to claim 11, wherein
the receiving the multicast service data in the unicast manner comprises: receiving a unicast scheduling signaling by using a user equipment identifier (C-RNTI), wherein the unicast scheduling signaling indicates time-frequency resources of the multicast service data; and
the receiving the multicast service data in the multicast manner comprises: receiving a multicast scheduling signaling by using a group wireless network temporary identifier (G-RNTI), wherein the multicast scheduling signaling indicates time-frequency resources of the multicast service data.

19. The apparatus according to claim 11, wherein the operations further comprise:
performing packet loss detection at a PDCP layer, to obtain receiving status information.

20. The apparatus according to claim 11, wherein the operations further comprise at least one of the following:
transmitting at least one of the following: negative acknowledgement (NACK) through a physical layer feedback channel, an RLC status report, or a PDCP status report; or
sending the received multicast service data to a PDCP layer.

* * * * *